US011699035B2

(12) United States Patent
Zhang et al.

(10) Patent No.: US 11,699,035 B2
(45) Date of Patent: *Jul. 11, 2023

(54) GENERATING MESSAGE EFFECTIVENESS PREDICTIONS AND INSIGHTS

(71) Applicant: ADOBE INC., San Jose, CA (US)

(72) Inventors: Pin Zhang, Kanagawa (JP); Chhaya Niyati Himanshu, Hyderabad (IN); Hiroyuki Hayashi, Tokyo (JP)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,444

(22) Filed: Apr. 6, 2022

(65) Prior Publication Data

US 2022/0229981 A1 Jul. 21, 2022

Related U.S. Application Data

(63) Continuation of application No. 16/458,569, filed on Jul. 1, 2019, now Pat. No. 11,308,276.

(51) Int. Cl.
*G06F 40/205* (2020.01)
*G06N 20/20* (2019.01)
*G06N 5/04* (2023.01)

(52) U.S. Cl.
CPC ............. *G06F 40/205* (2020.01); *G06N 5/04* (2013.01); *G06N 20/20* (2019.01)

(58) Field of Classification Search
CPC ......... G06F 40/205; G06N 5/04; G06N 20/20
See application file for complete search history.

(56) References Cited

U.S. PATENT DOCUMENTS

| 10,664,662 B2 | 5/2020 | Awadallah et al. |
| 2013/0204700 A1 | 8/2013 | Synett et al. |
| 2013/0238319 A1 | 9/2013 | Minegishi et al. |
| 2015/0039417 A1* | 2/2015 | Schweier ........... G06Q 30/0246 705/14.45 |

(Continued)

FOREIGN PATENT DOCUMENTS

| JP | 2018-77338 A | 5/2018 |
| WO | 2018/088160 A1 | 5/2018 |

*Primary Examiner* — Bhavesh M Mehta
*Assistant Examiner* — Darioush Agahi
(74) *Attorney, Agent, or Firm* — Shook, Hardy & Bacon L.L.P.

(57) ABSTRACT

Messages are processed to generate effectiveness predictions and/or other insights associated with the messages. Candidate messages are processed through a natural language processing (NLP) component to parse the candidate message into message elements for further processing. The message elements are converted to a vector or set of vectors, which are provided as input to a machine learning model to make predictions of message effectiveness. A contribution score can be made for each message element of the candidate message, which may be indicative of the importance or relevance for the individual message element to the overall predicted message effectiveness. Other message elements not originally within the message can be provided as candidates to replace message elements already located within the message. In this way, a message that is likely to be effective, such being likely to have a high conversion rate, can be published or otherwise distributed.

20 Claims, 12 Drawing Sheets

(56) References Cited

U.S. PATENT DOCUMENTS

| | | |
|---|---|---|
| 2015/0220510 A1 | 8/2015 | Alba et al. |
| 2017/0134335 A1 | 5/2017 | Goldstein et al. |
| 2018/0060755 A1 | 3/2018 | Green et al. |
| 2018/0276718 A1 | 9/2018 | Thomas et al. |
| 2018/0308003 A1 | 10/2018 | Singh et al. |
| 2019/0318643 A1 | 10/2019 | Pajo |
| 2019/0332658 A1 | 10/2019 | Heckel et al. |
| 2020/0134015 A1 | 4/2020 | Kumagai et al. |
| 2020/0334410 A1 | 10/2020 | Yerebakan et al. |

* cited by examiner

GENERATING MESSAGE EFFECTIVENESS PREDICTIONS AND INSIGHTS

CROSS-REFERENCE TO RELATED APPLICATIONS

This application is a continuation of U.S. patent application Ser. No. 16/458,569 filed Jul. 1, 2019, the entire contents of which are incorporated by reference herein.

BACKGROUND

Computer network entities, such as network advertisers, typically work with publishers (e.g., a host website) to provide messages (e.g., advertisements) that user computing devices receive. For example, a user, browsing a web application of the publisher, can issue a query using particular key words. A network advertiser can identify the key words and provide a bid associated with the particular key words to the publisher indicating how much money the network advertiser is willing to pay for an advertisement to be displayed to the user computing device. After network communications between the network advertiser and publisher computing entity are made, the publisher's website can cause display of a message on the user computing device. Such a message may describe items for sale at the network advertiser's electronic marketplace website.

The user may then make or not make various selections or other actions associated with the message. Over time, entities can obtain information associated with these selections or actions, such as an estimated conversion rate. A conversion rate is the percentage or proportion of visitors to a website or application that complete some predefined action (e.g., the download of a software instance within the message). The conversion rate can be affected by various factors associated with a message, such as particular message words, message pictures, content of the message, web page message placement, etc.

Generating messages and predicting the effectiveness of messages can be challenging because new or different words or symbols may continuously be used, messages may be generated in different natural languages, and a vast amount of computing resources, such as memory, can be consumed when training and executing predictive software models.

SUMMARY

Embodiments of the present invention relate to generating message effectiveness predictions (e.g., a predicted conversion rate) and/or other insights associated with messages. In certain embodiments, candidate messages are processed through a natural language processing (NLP) component to parse the candidate message into message elements (e.g., words, a combination of words, symbols, etc.) for further processing. The message elements are converted to a vector or set of vectors (e.g., real numbers), which are provided as input to a machine learning model to make predictions of message effectiveness. A contribution score can be made for each message element of the candidate message, which may be indicative of the importance or relevance for the individual message element to the overall predicted message effectiveness. In some embodiments, other message elements not originally within the message can be provided as candidates to replace or supplemented with message elements already within the message. For example, the word "sneakers" (associated with a relatively low conversion rate) in the message "black sneakers for sale" can be replaced with the phrase "basketball shoes" (associated with a relatively high conversion rate) such that the message reads "black basketball shoes for sale." In this way, a message that is likely to be effective, such being likely to have a high conversion rate, can be published or otherwise distributed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Definitions

Figure 1:
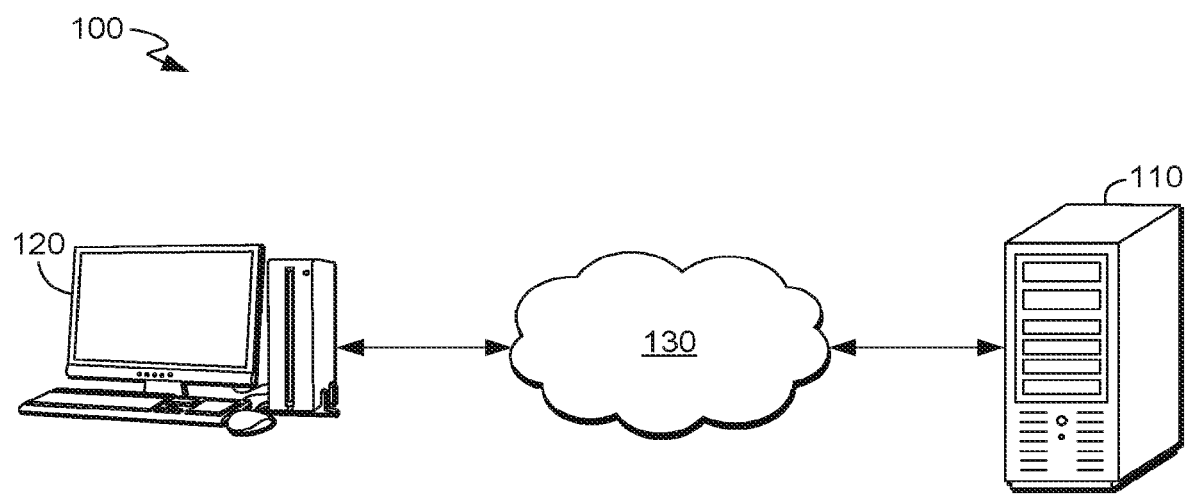
FIG. 1 is a schematic diagram of a computing environment in which aspects of the present disclosure are employed, according to some embodiments.

Various terms are used throughout, some of which are described below:

A "message" as described herein is any sequence of characters (e.g., a phrase, a sentence, a sentence coupled with an image, etc.) in natural language that contains message elements. A "message element" is an individual character or other sub-sequence of characters (e.g., a word, a symbol (e.g., an images, picture, emoticon, emoji, etc.) and/or combination of words) within the message. A message element is thus any character or sequence of characters that make up only a portion of the message. In various embodiments a message is a candidate advertisement for one or more services or one or more products for sale in a computer network environment. This computer network environment can include one or more publisher computing devices, one or more network advertiser computing devices, and/or one or more user devices. For example, a message can be a sentence that describes a marketing message such as, "Brand A phone for sale at X dollars." A message element can be the word "sale" within the message.

A "conversion rate" is the proportion or quantity of all website or application users that perform some predefined action. Alternatively, it is the quantity of predefined actions that occur over all application or website visits. Mathematically, the formula can be stated as the quantity of website or application users that perform some predefined action (i.e., the "conversion") divided by the total quantity of website or application users that have visited the website or application and have been presented with the message. The "predefined action" can correspond to any suitable user selection, user input, user download, user transaction, or any other action that a user performs that an entity (e.g., a network advertiser) defines to monitor. For example, the predefined action can be or include user downloads, user selections of advertisements, queries, user purchases, etc. per computer over multiple user sessions. In an illustrative example, the predefined action or conversion that is monitored is the number of clicks on an advertisement. In a hypothetical example, if a total of 50 users have clicked on the advertisement and the advertisement was displayed to 100 total user devices, the conversion rate is 50%. Fifty percent of users performed the predetermined action.

"Message effectiveness predictions", "conversion predictions", or associated predictions described herein corresponds to predicting how effective a particular message will be at: conveying its intended message, reaching a particular audience, prompting individuals to perform a predetermined action, or any suitable prediction. For example, predicting message effectiveness can be or include predicting a conversion rate. As described in more detail herein, predicting conversion rates for an input message can be based on analyzing historical input messages and their associated conversion rates. This may include using one or more machine learning models to identify historical patterns and associations for making predictions. In another example, message effectiveness predictions can include predicted open rate if opening a message is one of the predetermined actions constituting a conversion. A predicted open rate is a prediction of the rate at which emails are opened. This rate typically depends on how effective a message in the subject line is at catching the reader's attention.

A "contribution score" as described herein is a score of an individual message element that is indicative of the priority, importance, ranking, and/or relevance of contributing to the overall message effectiveness prediction. For example, a message can contain a plurality of words. A first word can include a score of 0.90 and a second word can include a score of 0.50. Because 0.90 is a higher score than 0.50, this indicates that the first word contributes more to a predicted conversion rate relative to the second word. This means that the first word is ranked higher or is more important for a predicted conversion rate. The contribution score can be determined based on one or more factors, such as historical conversion rates of historical messages. For example, the first word may have been included in historical messages, where the first word had or is otherwise associated with conversion rates of over 90%. Accordingly, the score of 0.90 would be provided.

A "candidate advertisement" or "candidate message" refers to a message that has the potential or is in the running to be published or distributed to users. For example, a candidate advertisement can be an advertisement that has not yet been provided to a publisher or advertiser for display. In like manner, a "candidate message element" refers to a message element that has the potential or is in the running to be a part of a message that is to be published or distributed. In some embodiments, a message element is a candidate message element when it is assigned a contribution score above a threshold. In other embodiments, a message element is a candidate message element by being included in a message for calculating a message effectiveness prediction.

The term "machine learning model" refers to a model that is used for machine learning tasks or operations. A machine learning model can analyze one or more input messages. In various embodiments, a machine learning model can receive an input and based on the input identify patterns or associations in order to predict a given output (e.g., predict that a message input will have a particular conversion rate). Machine learning models can be or include any suitable model, such as one or more: neural networks, word2Vec models, Bayesian networks, Random Forests, Boosted Trees, etc. "Machine learning" as described herein, in particular embodiments, corresponds to algorithms that parse or extract features of historical data (e.g., a data store of historical messages), learn (e.g., via training) about the historical data by making observations or identifying patterns in data, and then receive a subsequent input (e.g., a current message) in order to make a determination, prediction, and/or classification of the subsequent input based on the learning without relying on rules-based programming (e.g., conditional statement rules).

A "session" can be initiated when a user logs into a site, or is recognized by the site as a returning user who is associated with activity on the site. For example, a site may recognize a returning user via cookies. A session can be considered terminated after a user logs off of a site or becomes inactive (or idle) on the site for a predetermined period of time. For example, after 30 minutes of idle time without user input (i.e., not receiving any queries or clicks), the system may automatically end a session.

Overview

Existing technologies that generate the effectiveness of messages have various shortcomings. For example, existing techniques represent message features or words via a representation which combines N-grams with a weighted category list. These technologies include a model that predicts an occurrence of a word based on a sequence of N-words or the occurrence of its n−1 words and the word's category affiliation. However this representation lacks the capability of calculating similarity between different messages or words in a message if there are words unseen in the training data. Consequently, based on this feature representation, predictive insights are solely implemented by the word's category affiliation based on the required category list. For example, if training data did not include the word "smartwatch", the system may use a data structure, such as a hash map, to map this term to its category of "watch". Accordingly, predictions would be based on the category of the word instead of the word itself.

In these existing technologies, the performance of the predictions heavily depends on the statistical importance of the word category list features. However, in some languages, such as Japanese, word category features are far less important compared to N-gram features, which means that category-based wording suggestions may perform poorly for languages such as Japanese. Moreover, predictions based on categories of words instead of the words themselves risk prediction inaccuracy regardless of the natural language that the message is in. For example, estimating that a conversion rate is high because an advertisement used the word "watch" may be misleading because perhaps the actual word "smartwatch" is more correlated with a higher conversion rate than "watch" but because the system may not locate "smartwatch" in the training data, this substitute word would have to be used, which may cause inaccuracies.

Various existing technologies also incorporate inadequate models that require large training sets and consequently a lot of memory storage and CPU cycle execution (e.g., fetch, decode, read, execute). For example, some models use Logistic Regression with L1 regulation to perform model training. Although this method can reduce the quantity of covariates in the final prediction formula and have satisfactory explanation inferences, this model requires a relatively large training data set in order to get satisfactory prediction performance. Accordingly, large quantities of memory is consumed in order to store the excess training data. Moreover, execution of an input to feed the model requires analyzing the input against the excess training data to make predictions, thereby taxing CPU, which causes significant computing latency and potential CPU breakage or other problems, such as race conditions.

Various existing technologies generate alternative word candidates or estimate conversion rates by using word categories and frequent terms associated with the word categories. The categories are often sorted based on the coefficients of the learned regression model. Although this gives users an indication of what word category plays important roles to historic conversion rates, the alternative word candidates are fully restricted to terms which existing in the training data set. New or unused words in messages cannot be included because of the lack of training on these words. Consequently, users are left without adequate insight into what words to use in future messages.

Embodiments of the present invention relate to generating message effectiveness predictions and/or other insights associated with messages in a manner that resolves the shortcomings of conventional techniques. In certain embodiments, candidate messages are processed through a natural language processing (NLP) component to parse the candidate message into message elements (e.g., a word list) for further processing. For example, a message containing a plurality of words can be processed by a NLP library (e.g., MeCab) where each message is parsed into its words and each word can be tagged with a Part of Speech (POS) identifier (e.g., noun, adverb, adjective, etc.). These libraries can include rich language libraries, such as MeCab, which segments text in Japanese. These libraries can be configured to not place emphasis on word category features like existing technologies. In this way, message effectiveness predictions are not limited to languages, such as English, and can be accurate for messages that are in different languages.

These message elements are then converted to a vector or set of vectors (e.g., real numbers), which can be used as input to a machine learning model to make predictions of message effectiveness. For example, Word2Vec word embedding vector models can be used to map each message element into a vector. Then all word vectors for a single marketing message are averaged to form the vector representation in vector space, which is described in more detail herein. In this way, other machine learning models can take these vectors as input and also other words not located in the training can act as substitute candidates for replacing message elements. Such substitutes can be found in other vectors of the word embedding vector models based on a distance to other words.

In certain embodiments, a message effectiveness prediction, such as a conversion rate prediction, can then be made for the message. For example, based on historical messages and their associated conversion rates, certain words may surpass a popularity threshold or otherwise be associated with certain conversion rates. Accordingly, an incoming message may use one or more various message elements that have historically been associated with particular conversion rates. Consequently, a predicted conversion rate can be generated based on patterns and associations of the historical messages and conversion rates. In various embodiments, these prediction models do not require as much training data to make predictions compared to conventional technologies. For example, the prediction models used in certain embodiments employ random forest regression models instead of logistical regression with L1 regulation used in prior art technologies. Random forest regression models require less training data because these models use ensemble learning and because of the iterative voting nature of random forest models that can use the same training data for different decision tree tests, which can lead to different decision tree leaf node decisions.

A contribution score can be made for each message element (e.g., word) of the candidate message, which may be indicative of the importance or relevance for the individual message element to the overall predicted message effectiveness. This allows for better insights associated with the predicted message effectiveness unlike existing technologies. In some embodiments, other message elements not originally within the message can be identified and provided as candidates to replace or to be added to message elements already located within the message. In this way, a message can be selected and/or altered so that it is more likely to be effective, such as being more likely to have a high conversion rate.

Various embodiments of the present disclosure improve conventional technologies because: they do not rely on category lists; they can generate better replacement candidates for message elements when data is not located in the training data; and they are not limited to certain natural languages, such as English. For example, various embodiments improve these technologies by implementing word embedding vector models. A word embedding vector model converts natural language text into vectors (e.g., real numbers) and maps the vectors into vector space. In various instances, these vectors are mapped in vector space according to their semantic similarity to other vectors that represent other text. In this way, for example, if there is a missing word in the training data, such as "smartwatch", a semantically or contextually similar word can be utilized as a replacement, such as "computerized watch" or the like can be used instead of or in addition to the category "watch" as described above. In this way, predictions can be more accurate. Further, various embodiments allow the same word in different languages to be represented as the same vector and orientation in vector space. In this way, no one language is required and other languages, which do not depend on categories, such as Japanese, can easily be utilized.

Embodiments of the present disclosure improve prior art technologies by reducing memory consumption, causing better CPU performance (e.g., less CPU cycles are performed, leading to less likely race condition events, brakeage, etc.), and even in some cases reducing network bandwidth consumption. This is because the system does not require a large training data set and can conversely provide satisfactory prediction performance using relatively small training data sets.

Some embodiments of the present disclosure use models, such as random forest regression models as the machine learning technique for model training. This technique benefits from the capability of incorporating Ensembled learning. Ensembled learning helps improve machine learning results by combining several models. That is, various meta-algorithms combine multiple machine learning techniques into one predictive model in order to decrease variance or bagging, bias or boosting, and/or improve predictions or stacking. In this way, there can be better prediction performance using a relatively small training data set compared to existing technologies.

Various embodiments of the present disclosure improve these technologies by generating rich prediction insights. For example some embodiments recommend using certain alternative words, such as synonyms, to replace certain words in a message. In this way certain words can be identified as contributing the least or negatively to conversion rates and those words can be replaced with alternative words. Additionally or alternatively, message elements that have a contribution score over a threshold can be added to existing candidate messages without any of the candidate message's message elements being replaced. Likewise, message elements that do not have a contribution score over a threshold can be removed from existing candidate message without any of the candidate message's message elements being replaced. In some embodiments, a contribution score is calculated for each word in a message, which is indicative of the importance of that word in the overall conversion rate or message effectiveness. In some embodiments, only alternative word suggestions (e.g., synonyms) with a score higher than the word that does not contribute very well to the overall conversion rate are included in a recommendation for replacement. In this way, users can see what words in messages are and are not contributing to message effectiveness or conversion rates and see what replacement words could be used to obtain better message effectiveness or conversion rates.

Example Systems for Generating Message Effectiveness Predictions and Insights

Turning now to FIG. 1, a schematic depiction is provided illustrating an example system 100 for providing message effectiveness predictions and generating insights in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 110 that represent nodes in a cloud computing network. Various functions described herein as being performed by one or more entities may be carried out by hardware, firmware, and/or software. For instance, various functions may be carried out by a processor executing instructions stored in memory.

The system 100 depicted in FIG. 1 includes a message effectiveness server ("server") 110 that is in communication with a network 130. The system 100 further includes a client device ("client") 120 that is also in communication with the network 130. Among other things, the client 120 can communicate with the server 110 via the network 130, and generate for communication, to the server 110, a request to generate an effectiveness prediction of one or more words in a message (e.g., a marketing message). The request can include, among other things, a message input and a request to predict the conversion rate of the message and perform analysis on individual message elements, as described in more detail below. In various embodiments, the client 120 is embodied in a computing device, which may be referred to herein as a client device or user device, such as described with respect to the computing device 1000 of FIG. 10.

The server 110 can receive the request communicated from the client 120, and can search for relevant data via any number of data repositories to which the server 110 can access, whether remotely or locally. A data repository can include one or more local computing devices or remote computing devices, each accessible to the server 110 directly or indirectly via network 130. In accordance with some embodiments described herein, a data repository can include any of one or more remote servers, any node (e.g., a computing device) in a distributed plurality of nodes, such as those typically maintaining a distributed ledger (e.g., blockchain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 110 is embodied in a computing device, such as described with respect to the computing device 1000 of FIG. 10.

The server 110 can employ a variety of natural language processing, machine learning, text analysis, context extraction, and/or other techniques for evaluating the message input on the client device 120. In various embodiments, the server 110 can calculate one or more scores that corresponds to a confidence level or prediction of the message effectiveness. The scores and or prediction can then be communicated to the requesting client 120, which can cause the client 120 to provide for display the scores and/or one or more predictions associated with the message input as a result to the received request.

Figure 2:
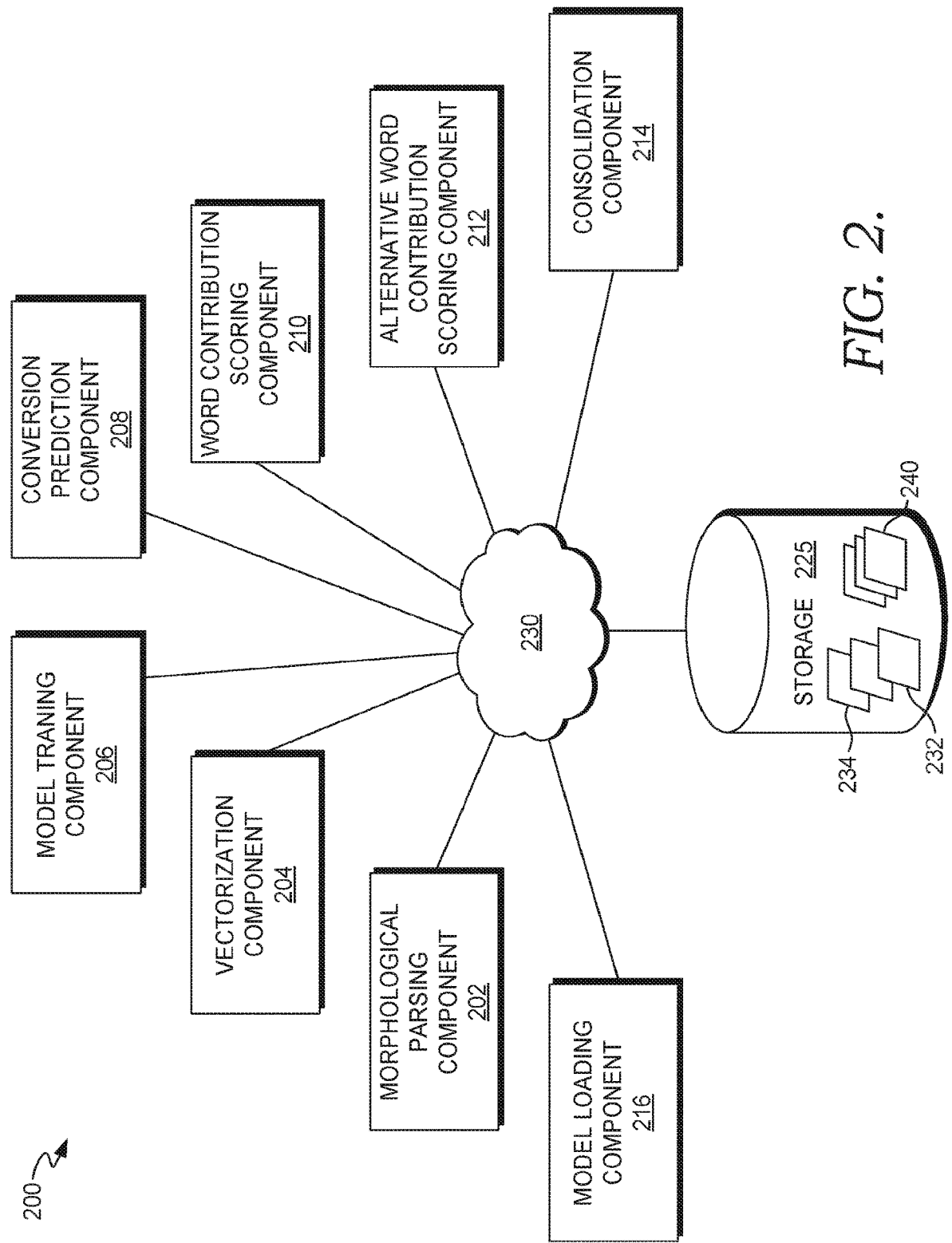
FIG. 2 is a block diagram of a system in which aspects of the present disclosure are employed, according to some embodiments.

Referring now to FIG. 2, a block diagram is provided showing aspects of an example computing system architecture suitable for implementing an embodiment of the disclosure and designated generally as a message effectiveness system 200 for generating effectiveness scores of one or more words in a message and providing insights. FIG. 2 is not intended to be limiting and other arrangements and elements can be used in addition to or instead of those shown in system 200, and some elements may be omitted altogether for the sake of clarity. Further, as with the system 100 of FIG. 1, many of the elements described herein are functional entities that may be implemented as discrete or distributed components or in conjunction with other components, and in any suitable combination and location. The functionality of system 200 may be provided via a software as a service (SAAS) model, e.g., a cloud and/or web-based service. In other embodiments, the functionalities of system 200 may be implemented via a client/server architecture. In some embodiments, there are more or less components than illustrated in the system 200. For example, in some embodiments, the system uses an unsupervised machine learning algorithm such that there is no model training component 206.

In embodiments, each of the components within the system 200 are located within the system 100 of FIG. 1. For example, in some embodiments, the model loading component 216, the morphological parsing component 202, the vectorization component 204, the model training component 206, the conversion prediction component 208, the word contribution scoring component 210, the alternative word contribution score component 212, and the consolidation component 214 are modules located within the server 110 (or multiple servers) of FIG. 1. In some embodiments, some of these components are located within the client device 120 of FIG. 1. As discussed throughout, various embodiments of the present disclosure generate message effectiveness scores (e.g., conversion rate scores) for one or more message elements of a message. The components within the system 200 can be used to accomplish this, as described herein.

The morphological parsing component 202 parses or tokenizes each message into message elements (e.g., words), analyzes morphological and/or syntactic properties of each message element, and generates tags based on the properties of the message. In this way, natural language messages can be understood and analyzed by machines. In some embodiments, the morphological parsing component 202 segments each message into morphemes, which is the smallest grammatical unit in language. A morpheme is a word or part of a word that has meaning. A morpheme cannot be divided into smaller meaningful segments without changing its meaning or leaving a meaningless remainder, and a morpheme has an identical meaning in different verbal environments. For example, although the word "carpet" can be broken up into two syllables—"car" and "pet"—these words have different meanings than the word carpet. Therefore, carpet is only one morpheme of "carpet". In this way, breaking up words into morphemes and analyzing them allows the system to study the internal structure of words and the relationships among other words. This may allow a system to understand a message, the message elements in a message, and the relationship between the message elements.

"Tokenization" in various embodiments means to segment the message into words, sentences, symbols, and/or other elements of the message. "Syntax" or syntactic properties refers to the structure of the message (as opposed to the semantics or meaning of the message or character sequences), such as the structure of a sentence. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, the POS of a message element is tagged. In some embodiments, the semantics or meaning of messages or message elements in messages are not analyzed. In these embodiments, only the syntactic properties are analyzed.

The vectorization component 204 generates vectors by converting each message into a vector representation. In some embodiments, the vectorization component 204 takes as input, the output generated at morphological parsing component 202. A "vector" as described herein is a set (e.g., an array) of real numbers (e.g., integers) that together represent a given message or message element. In some embodiments, each real number represents a feature or sub-element of a message. For example, an input vector can be a tuple of one or more values, such as scalars (e.g., [0, 0, 1, 0, 0]) where each value corresponds to whether a given word is present in the message. In some embodiments, the vectorization component 204 generates vectors via a word embedding vector model. In this way, each embedding vector can represent a point or coordinate in n-dimensional space, where n is the number of dimensions. Accordingly, each message element can be mapped into vector space such that contextually similar (e.g., semantically similar) words can be located if, for example, certain message elements are not located in training data. Word embedding vector models are described in more detail below.

The model training component 206 performs machine learning model training. In various embodiments, machine learning model training includes the process of implementing one or more machine learning algorithms with training data (e.g., a set of historical messages) to learn from. These learning algorithms may find patterns or associations in the training data that map the input to the target (e.g., the output prediction desired). For example, it can be determined that 90% of the messages that were used where a user was converted for a particular brand, a particular word was always used. Responsively, the target prediction can be that any message that uses the particular word will have a higher conversion rate. In various embodiments, training is succeeded by the process of repeatedly running or feeding test data (e.g., messages) through the model in order to tune the model until the model makes adequate predictions. In some embodiments, this includes determining the values for all weights (e.g., determining how important a word is for conversion by weighting the word with a particular value). In various embodiments, training is succeeded by testing, where the data set corresponds to data points that the model has not processed before. Based on the patterns and associations made with the test data, predictions can be made for the test data. In this way, a user can see if the model is predicting adequately by counting true positives, true negatives, false positives, etc. In various embodiments, the model training component 206 takes, as input, the output provided by the vectorization component 204, such as a vector representation of the message.

The word contribution scoring component 210 scores each individual message element. This score is indicative of how important, relevant, or weighted each message element is for message effectiveness predictions. For example, using the illustration described above, if an input message contained the particular word that over 90% of the messages associated with conversion also used, the conversion prediction component can predict that there is a high likelihood of conversion for that word. Consequently, that word can be scored and/or weighted accordingly. This prediction can be made for each word in a message. In this way, prediction scores can be adjusted or weighted based on each message item analyzed in each message. For example, using the illustration above, even though the message contains the particular word, it may also contain other words that are identified as being associated with low conversion rates. Responsively, the prediction score or weights can be reduced.

The conversion prediction component 208 generates an overall message effectiveness prediction (e.g., a predicted conversion rate) for a given message. In some embodiments, this prediction is made based on inferences or predictions made by the model training component 206. For example, in a deployed machine learning model environment, an incoming message can be vectorized and processed by the conversion prediction component 208 by identifying each message element in the message, identifying patterns or associations of the message element as indicated in the training data, and responsively making predictions. In some embodiments, the overall message effectiveness prediction is generated based on aggregating (e.g., summing) each individual contribution scores as generated by the word contribution scoring component 210. In some embodiments, each score is multiplied by its weight for each message element.

The alternative word contribution scoring component 212 scores alternative message elements that are not originally contained in a message. The alternative word contribution scoring component 212 can also substitute message elements for other elements if those other message elements have a score over a threshold (e.g., a particular word contribution score generated via the word contribution scoring component 210). In this way, the substitute message elements can act as replacements or replacement candidates for certain message elements in a particular message. Additionally or alternatively, the alternative word contribution scoring component 212 can add or subtract message elements without replacement depending on the contribution score. In this way, message elements can become candidates for addition to or subtraction from a message. For example, in some embodiments, high scoring synonyms (e.g., as found in a lookup table) of certain words that have low word constitution scores can be used as replacements in a message. In some embodiments, the alternative word contribution scoring component 212 determines alternative message elements based on running original message elements through a word embedding vector model (e.g., the same model used by the vectorization component 204). In this way, semantically similar or other contextually similar words compared to the original word is selected, which is described in more detail below.

The consolidation component 214 consolidates the outputs of the word contribution scoring component 210 and/or the alternative word contribution scoring component 212, among other things, to generate predictive insights. For example, this component can cause display (e.g., within the client device 120) of: a predicted conversion rate of a message, each word in the message and their corresponding contribution scores, and/or high contribution score synonyms or replacement candidates for words whose contribution scores are lower than zero.

The model loading component 216 loads the model from the storage 225, which is saved during training (e.g., via the model training component 206). Storage 225 generally stores information including data, computer instructions (e.g., software program instructions, routines, or services), and/or models used in embodiments of the technologies described herein. In an embodiment, storage 225 comprises a data store 234 (or computer data memory). Data store 234 may store a stream of sequence and/or labelled training data. Storage 225 may also include pattern inference logic 232. Briefly, pattern inference logic 232 may include machine learning, statistical, and/or artificial intelligence logic that is enabled to detect, infer, or otherwise recognize patterns and or features within data. For instance, pattern inference logic 232 may infer explicit, latent, or hidden pattern recognition features or patterns within the training data. Further, although depicted as a single data store component, storage 225 may be embodied as a data store or may be in the cloud.

By way of example and not limitation, data included in storage 225, as well as any user data, may generally be referred to throughout as data. The data within the storage 225 may be structured (e.g., tabular or database data), semi-structured, and/or unstructured (e.g., data within social media feeds, blogs, etc.). Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; etc.) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, data or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources.

As noted above, pattern inference logic 232 may contains the rules, conditions, associations, classification models, and other criteria to execute the functionality of any of the components, modules, analyzers, generators, and/or engines of systems 200. Storage 225 may include software identity mapping data 240. The software identity mapping data 240 may contain software item identifiers or normalized software identifiers. For example, the software identity mapping data 240 may include dictionaries or databases or words as found in a word embedding vector model.

Figure 3:
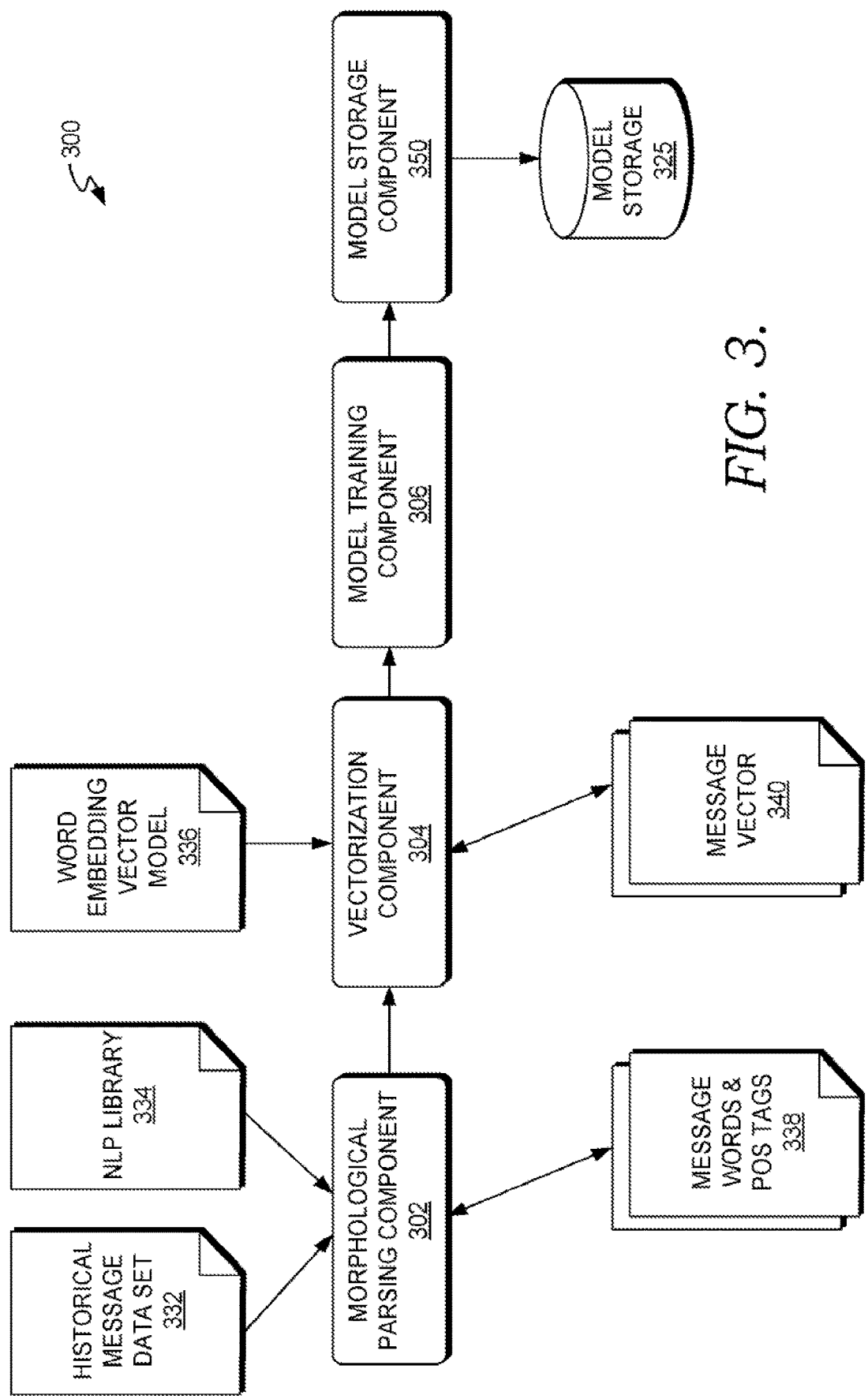
FIG. 3 is a block diagram of an example system of a training phase for employing aspects of the present disclosure, according to some embodiments.

FIG. 3 is a block diagram of an example system 300 of a training phase in which particular aspects of the present disclosure are employed in, according to some embodiments. In some embodiments, some or each of the components represent some or each of the components as indicated in the system 200 of FIG. 2. The training phase is a phase when historical messages are analyzed and one or more machine learning models are trained with the historical message data set 332. In various embodiments, the historical message data set 332 includes messages and other metadata associated with the messages. For example, each message may include metadata indicating number of conversions from the message, conversion rates associated with the message, total number of visitors to a publisher website where the message was displayed, number of clicks on the message, etc.

The morphological parsing component 302 (which may correspond to the morphological parsing component 202 of FIG. 2) applies morphological analysis to the data within the historical message data set 332. In various embodiments, the data set 332 represents a history of messages (e.g., several advertisement messages that have been caused to be displayed on a publisher's website and user device). In some embodiments, the morphological parsing component 302 converts each message into a word list and tags each word with a POS identifier (e.g., Noun, Verb, Adjective, Adjectival Noun, etc.). In some embodiments, the word list takes on a Comma Separated Values (CSV) file. The CSV file is a plain text file where every set of data is separated by commas. For example, the CSV file may include 4 columns. The first column may be a message column where the actual message content of messages are stored. The second column may be the timestamp or date when the message is provided on publisher sites or displayed on user devices. The third column may be message impressions, such as pay-per-click impressions. A message impression is a measurement, such as quantity of responses from a web server to a page request from the user browser. The fourth column may specify how many or the proportion of conversions (e.g., the purchase of the advertised item) that occurred while the message was displayed or otherwise in connection with the message.

In some embodiments, in response to the CSV file being generated that includes individual words of messages, a Natural Language Processing (NLP) library 334 is loaded to perform morphological analysis to each message (or words in the message) of the CSV file. In various embodiments, the NLP libraries perform the syntactic and then POS tagging as described above, such as tokenizing each message element from a message and responsively tagging the POS for every word within the message. For example, the NLP libraries may be or include MeCab and Juman++. MeCab is an open-source text segmentation library for use with text written in the Japanese language. Juman++ is a Japanese morphological analyzer. Although these NLP libraries are described in terms of Japanese, it is understood that the NLP libraries can exist in any suitable natural language, such as Spanish, French, English, etc. The output of the morphological parsing component 302 is the output 338, which contains each parsed natural language message element in a message coupled with a POS tag for every message element.

In various embodiments, the vectorization component 304 (which may correspond to the vectorization component 204 of FIG. 2) receives the output at 338 and converts the natural language message elements of each message into a vector representation of real numbers. In some embodiments, a word embedding vector model 336 is used, such as WORD2VEC, to map each message element into a vector within vector space. All of the vectors that represent a corresponding message element are averaged or otherwise combined to form the vector representation for the entire corresponding message. This represents the output message vector 340. For example, for each message, all of the message elements are converted into integers and are linearly combined such that the entire corresponding message is mapped in vector space. In this way, similar message, such as those with only 1 or 2 different words, would be close in distance, whereas other messages with very different words would be further distance away in vector space. Word embedding vector models are described in more detail below.

The model training component 306 (which may corresponding to the model training component 206 of FIG. 2) performs machine learning model training using the vectorized message data set (i.e., the output message vector 340). In this way, patterns and associations are determined within the historical message data set, such as number of conversions associated with message elements. In some embodiments, Random Forest Regression is used as the learning model for training. In some embodiments, K-fold cross validation is applied to assess performance. K-fold cross validation is a method to split training and test data (together forming K data set) to assess whether the machine learning model would generalize to an independent data set to determine how accurate the predictions the model will give. In this way, problems, such as overfitting can be identified.

For K-fold cross validation, first the K data set is partitioned to K chunks (e.g., groups of messages and other metadata, such as conversion statistics). That is, the K data set is shuffled randomly and then the data set is split into K groups. For each group (i.e., iteratively run through each group): identify the group as a test data set and take the remaining groups as a training data set. In this way, each group will be a test data set at some point. One or more models are fit on the training set and evaluate it on the test set. Then each performance for each K group can be aggregated (e.g., averaged) in some embodiments. This allows models to be chosen. The model that performs well or over a threshold performance on the training data is selected. In some embodiments, the model with the best performance is picked and passed to the next processing step. In some embodiments, Mean Absolute Error (MAE) is used as the metric measurement to model performance to determine "best" performance. The model storage component 350 receives the "best" performance model generated in the model training and stores it to the model storage 325 so that this model can be used in a deployed setting on actual data sets.

Figure 4:
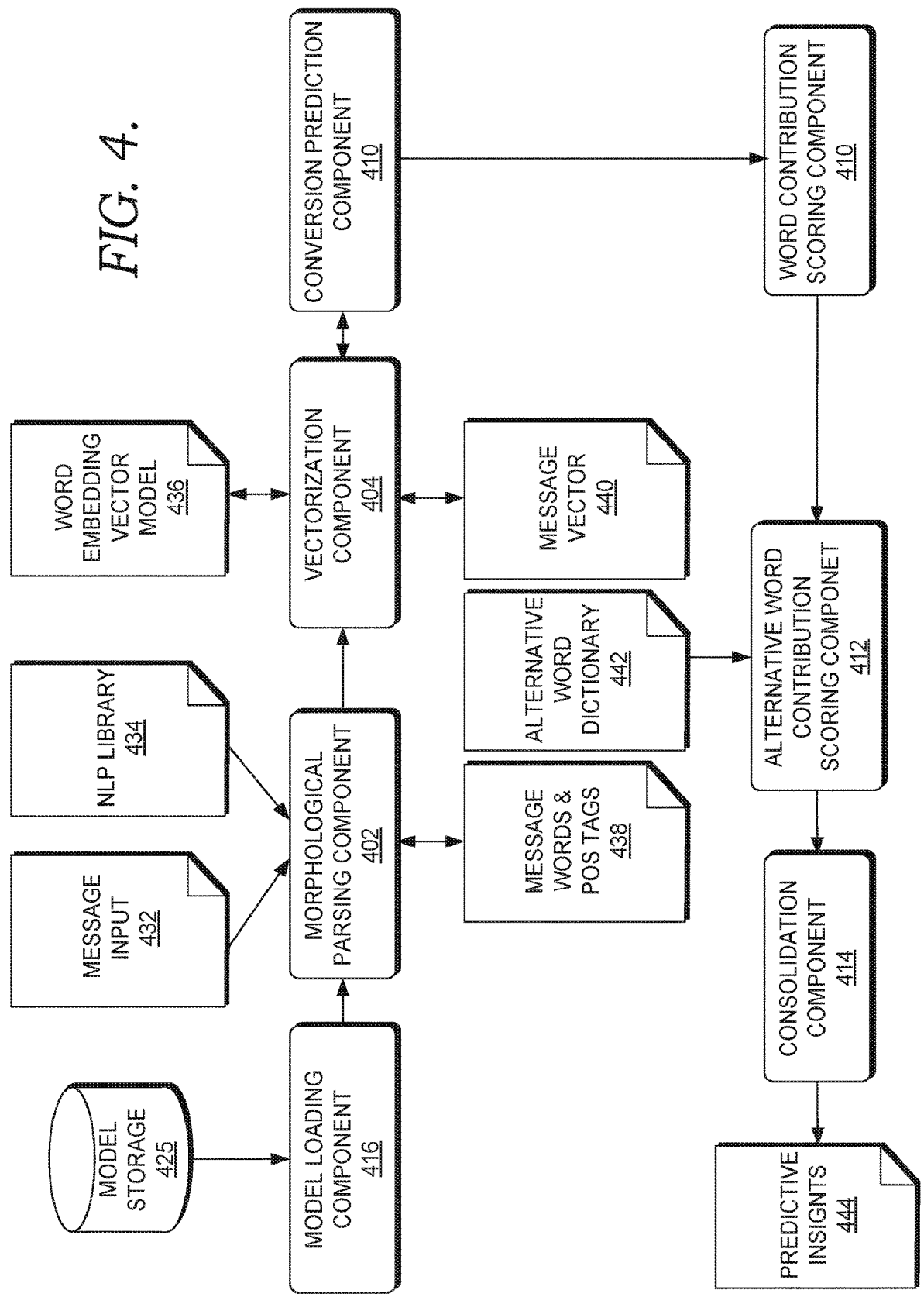
FIG. 4 is a block diagram of an example prediction phase for employing aspects of the present disclosure, according to some embodiments.

FIG. 4 is a block diagram of a prediction phase system 400, according to some embodiments. Prediction phase occurs in a deployed model environment when predicted message effectiveness or other insights are provided for a given message input. This message input is the only input at this stage. The system uploads a message and then predicts the message effectiveness of the message and message element suggestions, as described in more detail herein. In some embodiments, the system 400 represents some or each of the corresponding components of the system 200 and/or system 300.

The model loading component 416 (which may correspond to the model loading component 216 of FIG. 2) loads the model from the model storage 425 (e.g., persistent storage). In some embodiments, the storage 425 represents the same storage 325 as indicated in the training phase system 300 of FIG. 3. Accordingly, the model loading component 416 loads the model selected in response to performing k-fold cross validation, which was saved in the training phase.

The morphological parsing component 402 (which may correspond to the morphological parsing component 202 of FIG. 2) applies morphological analysis on the message input 432 by converting the message into a word list and tags each message element with a POS tag. After reading the message input 432, a NLP library 434 (e.g., MeCab or Juman++) is loaded to perform morphological analysis on the message input 432. For example, a user may input the message "Brand A Iridium sunglasses for sale 10% off", which represents the message input 432. In response to breaking up each word into morphemes and analyzing syntax, the NLP library 434 may tokenize or segment the input message into its constituent word parts and responsively provide a POS tag—i.e., Brand A-noun, Iridium-noun, sunglasses-noun, sale-verb, 10% off-adjective (i.e., the message words and POS tags 438). In some embodiments, alternative or additional analyses are performed, such as indicating the object, subject, etc. or other syntactic elements of the message indicative of structural analysis of the message.

The vectorization component 404 (which may correspond to the vectorization component 204 of FIG. 2) converts the parsed and tagged message into a vector representation. For example, a word embedding vector model 436 can be used to map each word into a vector. Then all the vectors can be averaged or otherwise linearly combined to form a vector representation in vector space. For example, using the illustration above, the message "Brand A Iridium sunglasses for sale 10% off" can be represented in vector space as [1, 4, 8], which represents the message vector 440. This vector can represent different dimensional values in vector space, which is described in more detail herein.

In some embodiments, it is determined that the loaded model derived from the model storage 425 (and/or the training/testing data) does not include message elements that the input message contains. Unlike the existing technologies described above, various embodiments map the message elements into vectors in a vector space of a word embedding model even if certain message elements are not located in the training data. For example, in the message "Brand A Iridium sunglasses for sale 10% off", the word "Iridium" or any other word may not be located in the training data. Accordingly, this word is run through a word embedding vector model to determine its vector representation in vector space, which may be [3,4] (e.g., indicating "reflective lens"). Responsively, the vectors [3,4] representing this term are run through the machine learning model (e.g., Random Forest) for message effectiveness predictions.

The conversion prediction component 408 (which may correspond to the conversion prediction component 208 of FIG. 2) predicts the overall message effectiveness or conversion rate for the message input 432. It receives the message vector 440 from the vectorization component 404 and then uses the loaded machine learning model from the model storage 425 to make the predictions. For example, using a loaded Random Forest Regression model, the conversion prediction component 408 may predict that the message "Brand A Iridium sunglasses for sale 10% off" (now represented as a vector) has a 23% predicted conversion rate based on historical messages that used the same or similar words, message elements, combinations of message elements, etc. and their associated conversion rates.

The word contribution scoring component 410 (which may correspond to the word contribution scoring component 210 of FIG. 2) calculates the message effectiveness contribution score for each message element in the message input 432. This is indicative of how important or relevant a given message element in message is for the overall message effectiveness prediction. The assumption is that there are certain message elements or combinations of message elements that are more likely to cause or be associated with higher conversion rates. For example, the exact discount value and the product may be indicative of a particular conversion rate. Using the illustration above, for the message "Brand A Iridium sunglasses for sale 10% off", "Brand A" may be associated with a 40% conversion rate (e.g., all messages within the historical data with this term had a 40% conversion rate) and "10% off" may be associated only with a 12% conversion rate. This process may occur for each word and/or combination of words in this message.

The alternative word contribution scoring component 412 (which may correspond to the alternative word contribution scoring component 212 of FIG. 2) calculates scores for alternative message elements that act as replacement candidates for message elements in a message. Alternatively or additionally, the alternative word contribution scoring component 412 calculates scores for alternative message elements that are added to or removed from (or become candidates for such addition or removal) messages without replacement based on their contribution scores. In some embodiments, the alternative message elements are message elements that are semantically or otherwise contextually similar to existing message elements as determined by a word embedding vector model (e.g., the same model used by the vectorization component 404). Alternatively, the alternative message elements are synonyms of certain words as determined by a synonym lookup table data structure or the alternative word dictionary 442. In these embodiments, certain words can be mapped to its synonym via a lookup table structure. In various embodiments, only those message elements that have a contribution score lower than a threshold are mapped to other alternative words that are candidates to replace particular message elements. In an example illustration, for the message "Brand A Iridium sunglasses for sale 10% off", the word "Iridium" may have a low contribution score of 1.2%, indicating that this word was associated with a small percentage of conversion rates in historical messages. Responsively, the alternative word contribution scoring component 412 (and/or the vectorization component 404) can map "iridium" to a contextually similar word in vector space via a word embedding vector model and/or map this term to its synonym via a lookup structure. Accordingly, the mapped word may be "reflective coating" or the like. In response to this mapping, contribution scores can be generated for the replacement candidate message element. If the contribution scores are above a threshold, then candidates can be recommended as replacements. If not, then the process can repeat until a new candidate has a score over a threshold. Using the illustration above, it may be recommended to replace the word "Iridium" with "reflective coating" and "10%" with "30%" based on the high contribution scores of the candidate word replacements. Accordingly, the new recommended message may be, "Brand A reflective lenses sunglasses for sale 30% off".

The consolidation component 414 (which may correspond to the consolidation component 214 of FIG. 2) consolidates the outputs of the contribution scores of the original message elements and the added, removed, or replacement message element candidates in a single predictive insights 414 format, such as a single web or app page. For example, using the illustration above, the consolidation component 414 causes display of the predicted conversion rate of the message "Brand A Iridium lense sunglasses for sale 10% off." The consolidation component 414 can also cause display of original message elements in the message and their corresponding contribution scores. The consolidation component 414 can also cause display of alternative message elements and corresponding contribution scores that are replacement candidates for other words in the original message.

Figure 5:
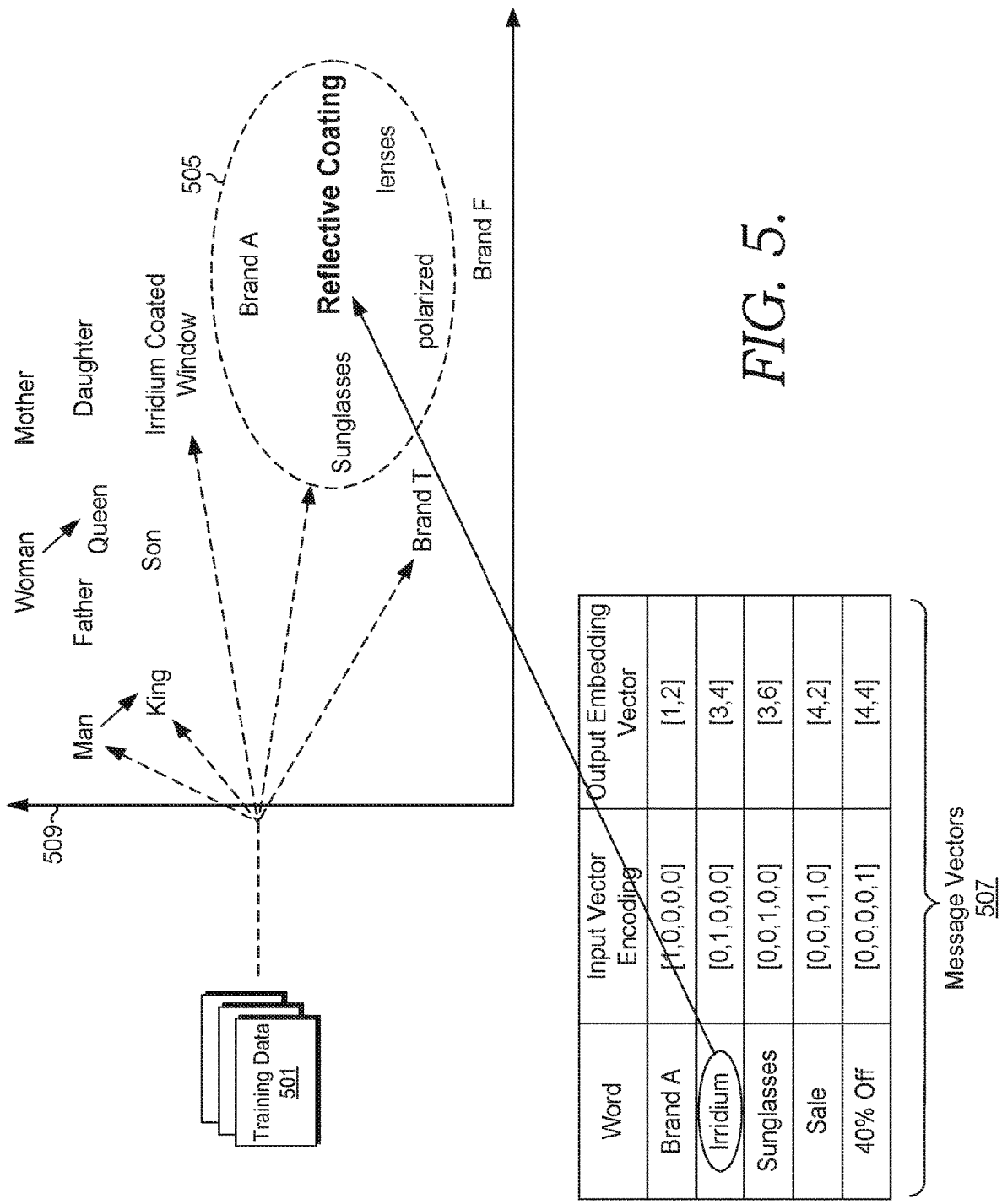
FIG. 5 is a schematic diagram illustrating how message vectors associated with messages are run through a word embedding vector model, according to some embodiments.

FIG. 5 is a schematic diagram illustrating how message vectors associated with messages are run through a word embedding vector model, according to some embodiments. In some embodiments, functionality described in FIG. 5 is performed by the vectorization component 202, 302, and/or 402. FIG. 5 includes the training data 501, the message vectors 507, and the vector space 509. The vector space 509 includes multiple vectors (e.g., man, king) illustrated in natural language text for convenience but are typically represented as vectors. It is understood that although the vector space 509 is a representation with particular vectors and dimensions, more or less vectors and dimensions can be present with different, more, or fewer string representations.

In some embodiments, the word embedding vector model is a Word2vec model. A word2vec model is a two-layer network model that runs one or more input vectors (e.g., which represent a message element) through a hidden layer (i.e., a column-row matrix) and a projection layer (e.g., a softmax classifier). Word2vec models predict target strings from source context words (i.e., via the Continuous Bag of Words (CBOW) algorithm) or inversely predict source-context words from target words (i.e., via the skip-gram algorithm). In embodiments, when words are processed through a corresponding Word2vec or other word embedding model, the words are numerically represented in a word embedding that shows associated vectors (e.g., other groups of string identifiers) and the distances from the string representations to each of those vectors, which is described in more detail below. For example, the string "male" can be represented as a "1" in vector space and the string "female" can be represented as a "0" in vector space.

In order to plot data points or message element vectors within the vector space 509, the model is trained using the training data 501. In various embodiments, the training data 501 includes a large corpus of unstructured data (e.g., documents, news articles, social media posts, news feeds, blogs), semi-structured, and/or structured data (e.g., database values). The training data 501 is also an input of the word embedding vector model. The training data 501 includes some or each of the words as found within the vector space 509—man, king, father, son, woman, queen, mother, daughter, Brand A, reflective coating, etc.

In some embodiments, the vector space 509 represents a "pre-trained" embedding. A pre-trained embedding is a static model that is generated without feedback, retraining, or reference to the data sets being fed through it. For example, a user may download a static word embedding vector model from an online source, which is already trained and includes the vectors or data points already mapped in vector space according to semantic similarity between words. In other embodiments, the vector space 509 represents a "retrained" or trained embedding. A retrained or trained word embedding model is an embedding that receives training feedback after it has received initial training session(s) and is optimized or generated for a specific data set (e.g. generate word element alternatives, etc.). For example, after initial data points are plotted to the one or more word embedding vector model, the system can "retrain" the word embedding vector model(s) a second time so that any vectors or words (e.g., "Iridium") in a future data set are consistently mapped to its closest neighbor(s) (e.g., "reflective coating", "lenses") or other word according to the policy implemented. In some embodiments, retraining includes issuing feedback to make sure the correct data point pairing is utilized.

In order to map each of the words to its contextually appropriate points in the vector space 509, training algorithms are utilized. For example, in some embodiments, the word embedding vector model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) = \frac{\exp\{\text{score}(w_t, h)\}}{\Sigma \text{ word } w' \text{ in } Vocab^{\exp\{\text{score}(w', h)\}}} \quad \text{Equation 1}$$

Where score ($w_t$, h) computes the compatibility of word $w_t$ with the context h. The model is trained by maximizing its log-likelihood on the training set, that is maximizing $$J_{ML} = \log P(w_t \mid h) \quad \text{Equation 2}$$
$$= \text{score}(w_t, h) - \log\left(\frac{\exp\{\text{score}(w', h)\}}{\Sigma \text{Word } w' \text{in } Vocab}\right)$$

This yields a properly normalized probabilistic model for language modeling. Each probability is computed and normalized using the score for all other words w' in the current context h at every training step. In some embodiments, some models, such as word2vec, are trained using a binary classification objective, such as logistic regression, to discriminate the real target words $w_t$ from K noise words w", in the same context. Accordingly, instead of a softmax classifier, a noise classifier is used.

The output of the training algorithms and/or actual data input is each of the positional words in the vector space 509, which shows groupings of words that are semantically similar. "Semantic similarity" is the semantic distance between two or more concepts (e.g., message elements in integer form) according to a given ontology. An "ontology" is a class or data set that includes a set of attributes (e.g., words). For example, the tokens of man, king, father, son, woman, queen, mother daughter may belong to an ontology of "human titles." The "distance" between any two or more words in some embodiments is based on the similarity of their meaning and/or semantic content, as opposed to any syntax similarity. For example, "car" and "far" are syntactically similar but have two different definitions so they are not semantically similar.

In some embodiments, the output as represented in the vector space 509 is plotted in response to the word embedding vector model receiving and plotting points associated with the operations described with respect to a vectorization component For example, the message list that includes the message "Brand A Iridium sunglasses sale 10% off" may first be converted into input vectors via an input vector encoding (e.g., one hot encoding). For example, the word "Brand A" may be converted into the vector representation [1,0,0,0,0]. This vector representation shows five dimensions where each value corresponds to the ordered message elements in the message and whether the message element is TRUE or present. Because "Brand A" is the word being run through the word embedding vector model, the integer 1 is used to indicate its representation. "Brand A" does not contain any of the other words so the other vectors are represented as 0. Then the output embedding vector representation [1,2], which shows 2 dimensions, may be generated, which is indicative of the actual coordinates that the "Brand A" vector will be plotted in vector space 509 based on semantic similarity to other words and/or averaging or otherwise combining the output embedding vectors for all of the words within the message vectors 507.

In various embodiments, each message element in the message vector 507 is likewise converted into an input vector representation and output as another representation of a vector, which acts as coordinates within the vector space 509. For example, as illustrated in the message vectors 507, the word "Iridium" has in input vector of [0, 1, 0, 0, 0], where 1 represents Iridium or TRUE and because it does not contain any of the other words in the message, every other value is represented as 0. Then the output word embedding vector [3,4] is generated to use as coordinates in the vector space 509. As illustrated both in the vector space 509 and the output embedding vector, "sunglasses" and "iridium" are near each other in distance based on the closeness of the vectors [3, 4] and [3,6].

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. No similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 509, the cosine similarity between "man" and "king" and "woman" and "queen" are the same cosine distance, thus king in certain situations is semantically similar to queen given the inputs of man and woman. In some embodiments, the distance is represented as an average distance or the distance between a particular token in vector space 509 and an average of query terms. In some embodiments, the distance is represented via fuzzy matching, or the distance of closest token to a query term.

After the training data 501 is run through the training algorithm and represented as the vector space 509, some or each message element of the message "Brand A iridium sunglasses sale 10% off" (e.g., which may correspond to a currently analyzed message in a deployed model) is run through the word embedding vector model and plotted or located in the vector space 509. For example, as illustrated in FIG. 5, the message element "Iridium" is placed/found in the vector space 509 according to the ontology it belongs to and/or its semantic similarity to other words or data points. After the placing or finding the message element "Iridium" in vector space, its closest neighbor is located and/or closest neighbor at a particular directional distance. As illustrated in the vector space 509, "reflective coating" and "lenses" are the closest neighbor in terms of distance.

The distance threshold 505 illustrates scoring thresholds, statistics generation thresholds, and/or result candidate thresholds. The threshold 505 may correspond to a threshold distance each word may be from a term (e.g., "reflective lenses") to score and/or provide results. For example, man and king may be too far for the system to score those tokens for word replacement candidates. Although the distance threshold 505 is illustrated as encompassing only a few select set of words, it is understood that it can encompass any quantity of terms associated with any particular distance. In some embodiments, FIG. 5 represents or includes a word-category co-occurrence matrix (e.g., a compilation of vector spaces). A matrix includes one or more vectors of a first vector space multiplied by one or more vectors of a second vector space. This allows rows within the vector space to be normalized for summing to 1 to become a probability distribution. Words or vectors can be compared using their category distribution.

In some embodiments, the word embedding vector model as indicated in FIG. 5 is used to map one or more message elements to other elements, which may be candidates for replacing message elements. For example, as illustrated in the vector space 509, "Iridium" may be replaced by "reflective coating" in a message based on the distance and/or direction (e.g., Euclidian distance) between these message elements. In some embodiments, the word embedding vector model is used to map words to vectors, which is particularly useful for missing words in training data. For example, if a random forest regression model or other machine learning model used to make message effectiveness predictions did not have the word "Iridium" in the training data, a vector in the vector space 509 can be used as its vector representation, such as [4,5], which makes it possible to use this word as part of the input to the message effectiveness predictions. In these embodiments, words, such as "Iridium" are not necessarily replaced by other words in vector space, such as "reflective coating," but the original input word's (e.g., iridium) vectors are used as an input to feed another machine learning model for message effectiveness predictions.

Figure 6:
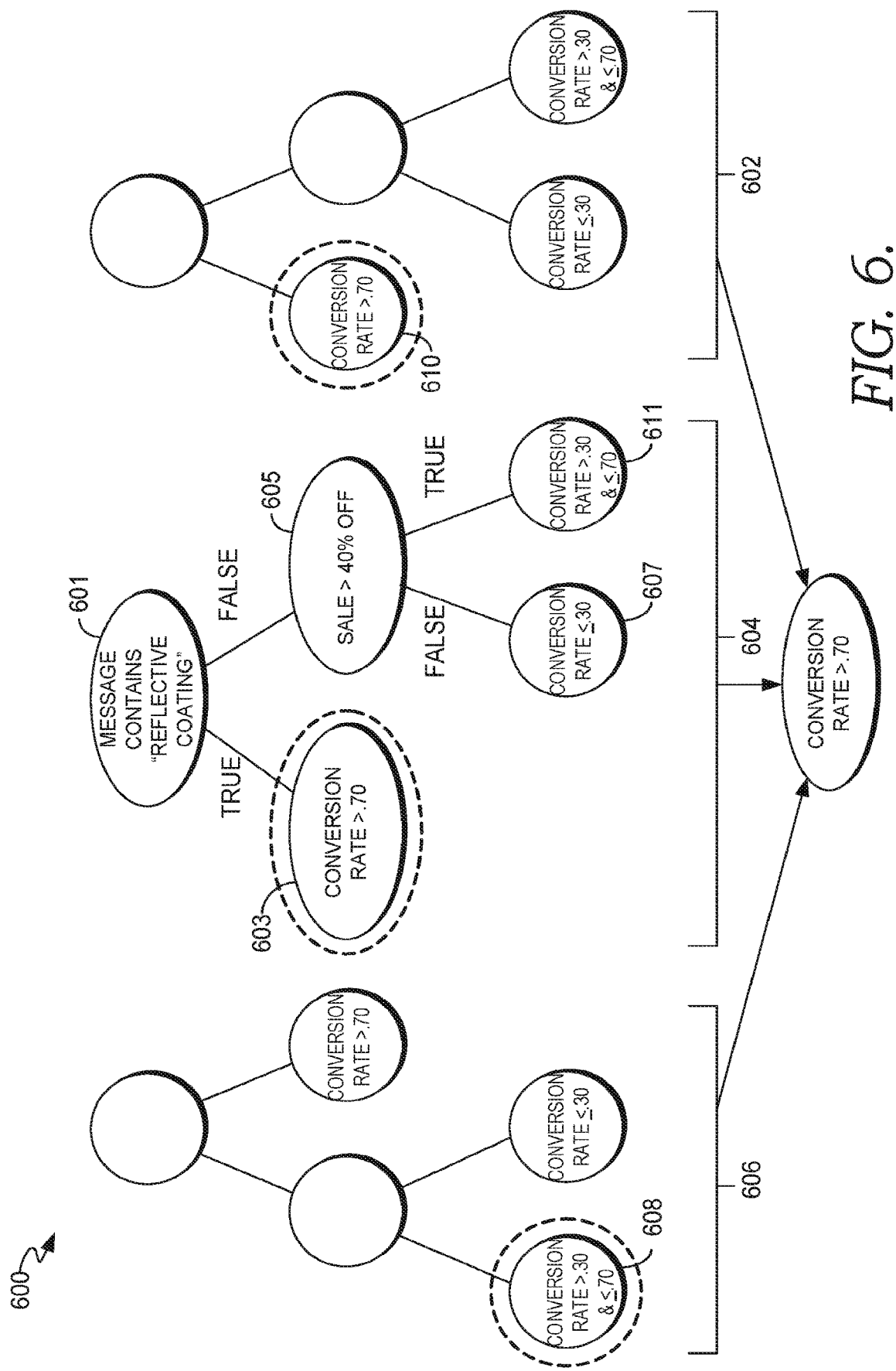
FIG. 6 is a schematic diagram illustrating an example random forest regression learning model, according to some embodiments.

FIG. 6 is a schematic diagram that illustrates an example random forest regression learning model 600, according to particular embodiments. Although FIG. 6 illustrates a specific random forest learning model, values with specific decision tree pathways, parameters, and tests, it is understood that any suitable value, node, test, and/or decision pathway may exist. It is also understood that although there is represented a specific quantity of decision trees with a particular quantity of nodes, there may be any suitable quantity of decision trees and corresponding nodes in the learning model. In various embodiments, FIG. 6 represents the machine learning model used by the conversion prediction component 208, 308, and/or 408.

A random forest learning model includes various decision trees that each present random and unique decision pathway tests to arrive at the same set of results. More particularly, each decision tree within a random forest has at least one different root or branch nodes and tests but the same leaf node answers. Each decision tree is analyzed to determine which leaf node was traversed, as only one leaf node is traversed in particular embodiments. The leaf node with the highest quantity of traversals within the forest determines the output prediction (i.e., majority vote wins). Each root node or branch node includes a "test" corresponding to a question that determines whether a TRUE or FALSE pathway is traversed. For example, referring to the root node 601, the test or question is whether the message contains the message element "reflective coating." If yes or TRUE, then there is traversal to the node 603, if no or FALSE there is a traversal to node 605 for further processing. Accordingly, the traversal of each decision tree starts at the root node, down through the branch nodes, until one of the leaf nodes are reached. The specific leaf nodes that are reached depends on the given tests within the root and branch nodes. In various embodiments, each of these tests represent "rules" as described above that improve existing technologies in order to automatically predict shipping behavior.

The learning model 600 includes decision tees 606, 604, and 602. Each decision tree has the same leaf node answers or values of "conversion rate greater than 0.70", "conversion rate less than or equal to 0.30" and "conversion rate greater than 0.30 and less than or equal to 0.70." These represent the predicted message effectiveness, such as predicted conversion rate. For example, the decision tree 604 includes the leaf nodes 603, 607, and 611, which represent the message effectiveness predictions. Identical leaf nodes are also indicated in the other decision tees 606 and 602. The learning model 600 is used to generate a prediction of the conversion rate range that a particular message is associated with. That is, if a user uses a particular message, the predicted conversion rate may be made based on using the message.

An example illustration of how each decision tree works is indicated by decision tree 604. The training data may indicate a history of messages that were published (e.g., by a publisher computing device and transmitted by an advertiser entity) or otherwise distributed and the conversion rates associated with the messages. For example, multiple marketing messages indicating various models, brands, styles of glasses for sale, the conversion action (e.g., selecting the advertisement), and the conversion rate may be stored as records in a database. The machine learning model may identify a pattern that within the historical messages, the messages that contained the words "reflective coating" had specific higher conversion rates greater than 0.70 or 70%. The root node 601 is responsively used for deciding whether an incoming message contains the words "reflective coating". If the message contains the words "reflective coating", then the "TRUE" pathway is traversed (e.g., a Boolean value is set to TRUE) and the system automatically predicts that the conversion rate will be greater than 70%, meaning that because the message contains the words "reflective coating", there is a high chance of conversion. However, if the incoming message does not include the words "reflective coating" the FALSE pathway is traversed to reach node 605 where another test is presented. In the incoming message, if the sale is not greater than 40% off (e.g., it is 10% off), then the FALSE pathway is traversed and the predicted conversion rate is predicted to be less than or equal to 0.30 or 30% according to leaf node 606. Alternatively, if the incoming message contained a sale that was greater than 40% off, then the TRUE pathway is traversed and the predicted conversion rate is greater than 0.30% but less than or equal to 70%. The decision tree 604 illustrates that the "winning" leaf node is node 603, indicating that the incoming message contained the words "reflective coating" such that the predicted conversion rate is greater than 70%.

In various embodiments, the decision trees 606 and/or 602 include different branch and/or root nodes and tests compared to the decision tree 604, but have the same leaf nodes. Accordingly, for example, decision tree 606 can additionally or alternatively include a branch or root node that has a test labeled, "message is displayed with picture X". FIG. 6 also illustrates that the majority vote winner is the "conversion rate greater than 70%". Decision tree 606 indicates that the predicted conversion rate is greater than 0.30 but less than 0.70, as indicated by the dotted lines around the leaf node 608. The decision tree 602 indicates that the predicted conversion rate is also 0.70, as indicated by the dotted lines around the leaf node 610. Accordingly, the system tallies up the scores—there are 2 "conversion rate greater than 0.70" and only 1 "conversion rate greater than 0.30 but less than or equal to 0.70" and 0 "conversion rate less than or equal to 0.30." Because the majority of decision trees indicate that the conversion rate will be greater than 0.70 for the incoming message, the system predicts that the predicted conversion rate for a message (e.g., "Brand A Iridium sunglasses for sale 40% off" will be greater than 70 percent.

Figure 7:
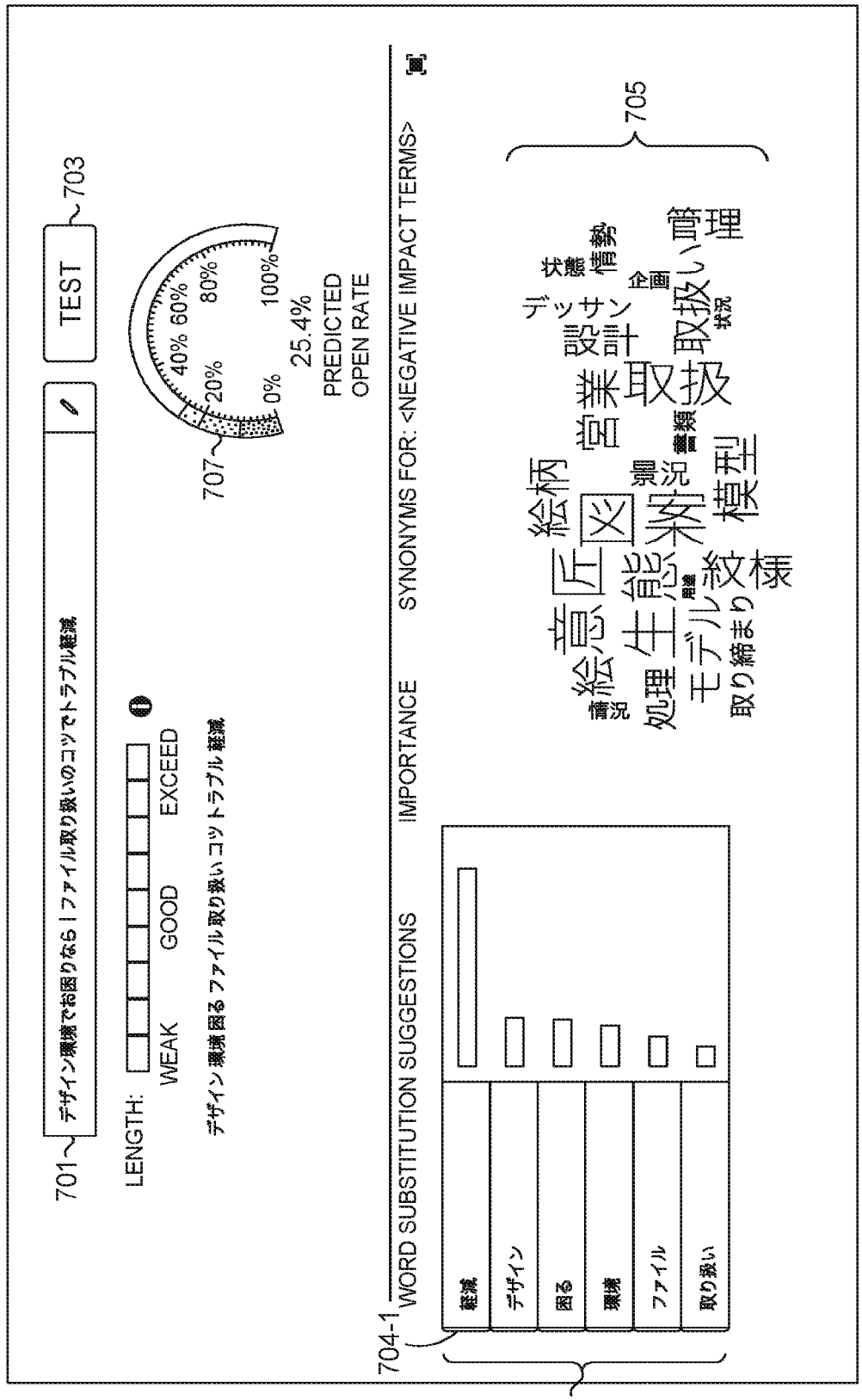
FIG. 7 is an example screenshot of a user interface, according to some embodiments.

FIG. 7 is an example screenshot 700 of a user interface, according to some embodiments. The screenshot 700 can be provided in any suitable manner. For example, in some embodiments, a user can open a client application, such as a web browser, and input a particular Uniform Resource Locator (URL) corresponding to a particular website or portal or perform a search query on a search engine and select a link that directs the user to the corresponding URL. In response to receiving the user's URL or query request, an entity, such as the server 110 may provide or cause to be displayed to a user device (e.g., the client device 120), the screenshot 700 represented by FIG. 7. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the views represent an aspect of a locally stored application, such that a computing device hosts the entire application and consequently the computing device does not have to communicate with other devices (e.g., the management computing entity 110) to retrieve data.

The screenshot 700 includes a plurality of user interface elements 701, 704, 703, 707 and 705. In some embodiments, the field 701 first receives user input of a candidate message, as indicated by the Japanese characters within the field 701. In various embodiments, the message is a candidate advertisement to provide to a publisher to be displayed on a user device. In response to the field 701 receiving the message, the element 703 may receive a user selection that is indicative of a request to predict the message effectiveness and other insights associated with the message that was input into the field 701.

In response to the received selection of the element 703, some or each of the functionality as described with respect to the system 200, 300, or 400 of FIG. 2, FIG. 3, and FIG. 4 respectively may occur. In some embodiments, each of the components within the system 400 may function. For example, an open rate may be predicted via the conversion prediction component 410. Responsively, the open rate may be caused to be displayed as the element 707. In another example, the alternative word contribution scoring component 412 may generate contribution scores for word candidates and responsively cause the "word substitution suggestions" 704 (i.e., actual message elements contained in a message input into the field 701)) to be displayed. Each message element may include a score or other indicator of rank, importance, relevance, etc. with respect to message effectiveness as described above. For example, the message element 704-1 may have the highest contribution score, which is reflected or indicated under the "importance" column. Accordingly, the message element 704-1 many not need to be replaced by an alternative word candidate, as opposed to other message elements illustrated in 704 which may need to be replaced by an alternative word candidate based on the low contribution scores as illustrated. In yet another example, the alternative word contribution scoring component 412 causes display of the group of synonyms 705 to be displayed for message elements that have a contribution score below a threshold (e.g., as determined by the word contribution scoring component 410) Alternative word candidates are displayed in 705 and the font size of them indicate their own contribution scores (e.g., a word in 705 is associated with a conversion rate of over 70%). The font size is directly proportional to the contribution scores. That is, the larger the contribution score, the larger the font size of the alternative word candidate. Likewise, the smaller the contribution score, the smaller the font size of the alternative word candidate. In this way, a user can easily spot which synonyms or alternative word candidates to use in replacement of a low scoring original message element input at the field 701. In some embodiments, the consolidation component 414 causes each of the elements to be displayed within the screenshot 700.

Exemplary Flow Diagrams

Figure 8:
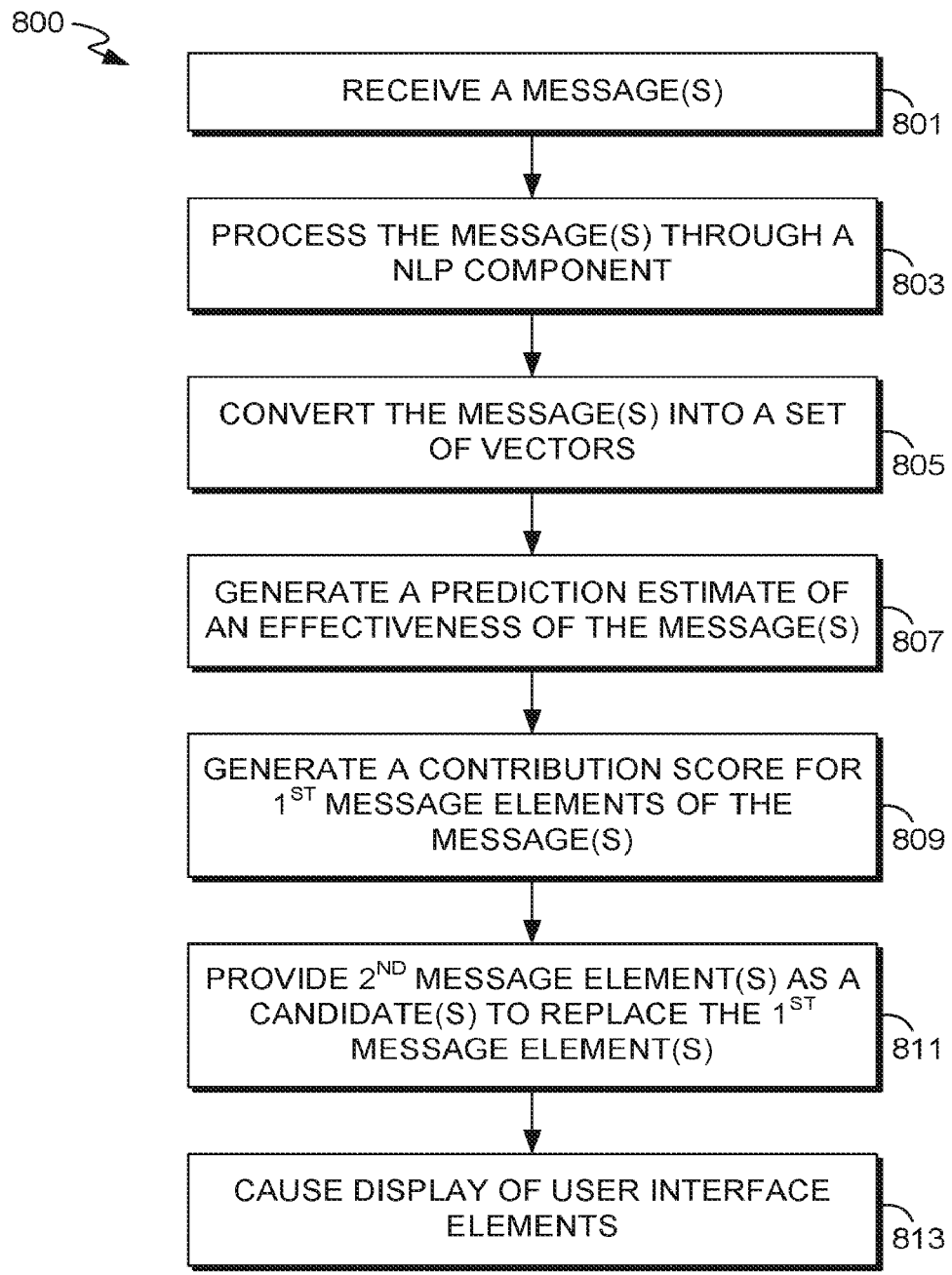
FIG. 8 is a flow diagram of an example process for generating a message effectiveness prediction and associated scores, according to some embodiments.

FIG. 8 is a flow diagram of an example process 800 for generating a message effectiveness prediction and associated scores, according to some embodiments. The process 800 (and/or any of the functionality described herein (e.g., process 900, 1000)) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, only the blocks 801-807 are a part of the process 800. In another example, certain blocks are removed, such as block 803, 805, and 813. Such added blocks may include blocks that embody any functionality described herein (e.g., as described in FIG. 2, FIG. 3, and/or FIG. 4). The computer-implemented method, the system (that includes at least one computing device having at least one processor and at least one computer readable storage medium), and/or the computer program product as described herein may perform or be caused to perform the processes 1000 and/or 1100 or any other functionality described herein. In some embodiments, the process 800 is performed by the server 110 of FIG. 1.

Per block 801, one or more messages are received (e.g., by the morphological parsing component 202)). In some embodiments, the one or more messages corresponds to a candidate advertisement for one or more services or one or more products for sale in a computer network environment. The computer network environment includes one or more publisher computing devices, one or more network advertiser computing devices, and one or more user devices. In some embodiments, block 801 occurs in response to a user inputting the message within the field 701 of FIG. 7 and selecting the "test" element 703. In some embodiments, the one or more messages is the message input 332 and 432 of FIG. 3 or FIG. 4 respectively. In some embodiments, the one or more messages are represented as a Japanese natural language message, as illustrated in the field 701 of FIG. 7. Alternatively, the one or more messages may represent one or more non-English languages (e.g., French, Spanish, Chinese, etc.). In some embodiments, however, the one or more messages may be represented in English.

Per block 803, the one or more messages are processed through a natural language processing component (e.g., by the morphological parsing component, 202, 302, and/or 402.

In some embodiments, block 803 includes parsing the message(s) into the message's constituent message elements. In some embodiments, block 803 includes segmenting each of the message elements into morphemes and tagging the message elements with POS identifiers. In some embodiments, semantic analysis is not performed on the message(s) or message elements. Rather, as described above, only morphological and/or syntactic analysis is performed. This may be because the semantic meaning of message elements in some languages is not as crucial compared to the syntax in those languages.

Per block 805, the one or more messages are converted into a set of vectors (e.g., by the vectorization component 204, 304, or 404). In some embodiments, in response to the processing the message elements through a NLP component, the message elements are converted into a first set of vectors of real numbers. The real numbers are mapped in vector space based on processing the message elements through a word embedding vector model. In these embodiments, the first set of vectors are oriented in the vector space according to a contextual similarity compared to a second set of vectors corresponding to other messages or message elements. For example, the word embedding vector model and vector space can be the same or similar concept described with respect to FIG. 5. For example, the message elements of the input message "Brand A Iridium sunglasses sale 10% off" can be converted to the input vector encoding and then the output embedding vector as illustrated in the message vectors 607. The output embedding vector can then be mapped as coordinates in the vector space 609 of the word embedding vector model.

Per block 807, a prediction estimate of an effectiveness of the message(s) is generated (e.g., by the conversion prediction component 210, 310, or 410). In some embodiments, based at least in part on the processing of the message(s) through the word embedding vector model, a first score associated with a predicted conversion rate is generated. In some embodiments, the "first score" can be any score related to the predicted conversion rate for the message(s), such as a contribution score of one or more message elements (and/or message elements that are candidate replacements) or the predicted conversion rate itself. The predicted conversion rate can be indicative of predicting a total quantity of users of a website or application that will complete a particular predefined action based on interacting with or viewing the message. The predicted conversion rate can additionally or alternatively be indicative of predicting a total quantity of user activities (e.g., selections, downloads, etc.) on a website or application that is or corresponds to a particular predefined action divided by or over non-user activities. In some embodiments, the generating of the first score or the generating of the prediction estimate per block 807 is further based on using a Random Forest Regression machine learning model. For example, referring back to FIG. 6, the learning model 600 or similar learning models may be used in the prediction estimate at block 807.

In some embodiments, the word embedding vector model, which can be generated per block 805, is used based at least in part on a first message element of the message(s) not being included in training data (e.g., within the storage 225, 325, and/or message data set 332) of a machine learning model. For example, the first message element may be missing in the training data. The first message element and/or the entire message(s) can be run through the vector space 509 to be mapped to a vector or vectors. In response to this mapping, the vectors can then be run through a machine learning model to make prediction (e.g., the machine learning model 600 of FIG. 6). This makes prediction performance stronger, as the system may always be guaranteed to make predictions based on all message elements in the message, regardless of the existence/non-existence of the message elements in training data Per block 809, a contribution score is generated (e.g., by the word contribution scoring component 210 or 410) for first message element(s) of the message(s). In some embodiments, this includes generating a contribution score for each message element of a plurality of message elements of the message(s). The contribution score can be indicative of an importance or relevance for each first message element for contributing to the predicted conversion rate. In some embodiments, the contribution score represents a second generated score.

Per block 811, one or more second message elements are provided (e.g., by the alternative contribution scoring component 212 and/or the consolidation component 214) as candidate(s) to replace or add to the first message element(s) or one or more of the first message elements are removed. In some embodiments, this includes determining that at least one contribution score of a first message element is below a threshold score (e.g., 0). Based at least in part on the determining that at least one contribution score of the first message element is below the threshold score, at least a second message element can be provided as a candidate to replace the first message element. In some embodiments, the providing of the second message element(s) per block 811 is based on utilizing a word embedding vector model. In these embodiments, the word embedding vector model is used to replace (or provide as a candidate to replace) the first message element of the message with an alternative message element (i.e., the second message element) based on a vector of the first message element being within a threshold distance in the vector space (e.g., vector space 509) with another vector. For example, the word "Iridium" may have a low contribution score and consequently run through vector space to find its closest neighbor, which may be "reflective lense." Accordingly, "reflective lense" may be provided as a candidate to replace "iridium" in the message.

In some embodiments, block 811 may be based on generating contribution scores for the second message element(s). In some embodiments this includes determining that at least one of the contribution scores (e.g., second score) for the first message element of the message is below a threshold score. Based at least in part on the determining that at least one of the contribution scores of the first message element being below the threshold score, a third score can be generated for the second message element. The second message element in various embodiments is not included in the message received at block 801 but is a candidate for inclusion in the message. Based at least in part on the third score being above the threshold score, at least the first message element can be replaced (or provided for replacement) with the second message element or the second message element can be added to the one or more messages without replacement. In some embodiments, certain alternative message elements that have contribution scores below the threshold score, are not provided as candidates. For example, a second contribution score can be generated for a third message element that is not included in the message but that is a candidate to replace a particular message element of the message. Based on the second contribution score being below the threshold score, the third message element is not provided as a replacement for the particular message element of the message.

In some embodiments, block 811 may alternatively or additionally be based on determining that the second message element is a synonym of the first message element and is associated with a conversion rate or contribution score that is above the threshold score. Per block 813, user face elements are caused to be displayed (e.g., by the consolidation component 214, 414). For example, the elements (or similar elements) 707, 704, and 705 of the screenshot 700 of FIG. 7 can all be caused to be displayed as a part of block 813. In various embodiments, the prediction estimate at block 807, the contribution score per block 809, and/or other message element candidates per block 811 can be caused to be displayed.

Figure 9:
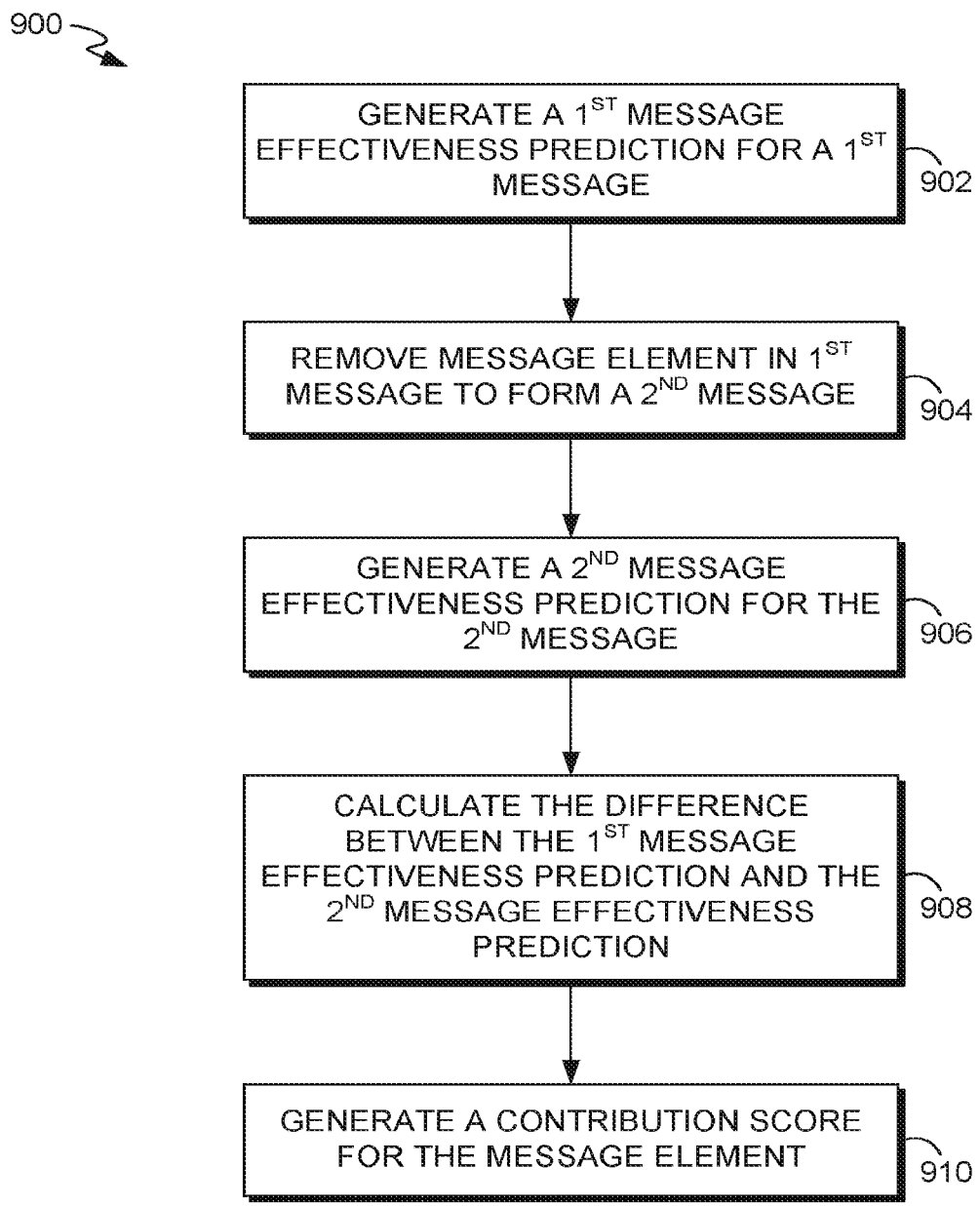
FIG. 9 is a flow diagram of an example process for generating a contribution score for an original message element, according to some embodiments.

FIG. 9 is a flow diagram of an example process 900 for generating a contribution score for an original message element, according to some embodiments. In some embodiments, the process 900 occurs as a part of or entirely block 809 of the process 800 of FIG. 8. In some embodiments, the process 900 occurs for each message element (e.g., word) of a message. In yet other embodiments, the process 900 is performed by a combination of the conversion prediction component 208 and 408 or the word contribution scoring component 210 or 410.

Per block 902, a first message effectiveness prediction for a first message is generated (e.g., by the conversion prediction component 208). For example, a conversion rate is predicted for the first message. Per block 904, a message element is removed or extracted from the first message to form a new second message. For example, an original message might be "Brand X memory foam winter gloves 20% off", which has a 38% predicted conversion rate. Per block 904, the message element "memory foam" may be extracted from the message so that the new second message reads "Brand X winter gloves 20% off."

Per block 906, a second message effectiveness prediction for the second message is generated. For example, using the illustrated above, the new conversion rate may be predicted to be only 13%. The discrepancy in predicted conversion rates may be indicative of "memory foam" being a popular type of winter glove and without this term, a user is less likely to select or otherwise perform a conversion task. Per block 908, the difference between the first message effectiveness prediction and the second message effectiveness prediction is calculated. For example, using the illustration above, 13% or 0.13 is subtracted from 38% or 0.38 to arrive at a score of 25% or 0.25. This gives insight into the importance or contribution of the extracted message element for the entire message. Per block 910, the contribution sore for the message element is generated. For example, using the illustration above, 0.25 or 25% is the contribution score at block 910. This is indicative of the message element contributing to the message effectiveness prediction by 25% or 0.25. That is, with the message element present in the message, the conversion rate is predicted to be 25% higher than it otherwise would.

Figure 10:
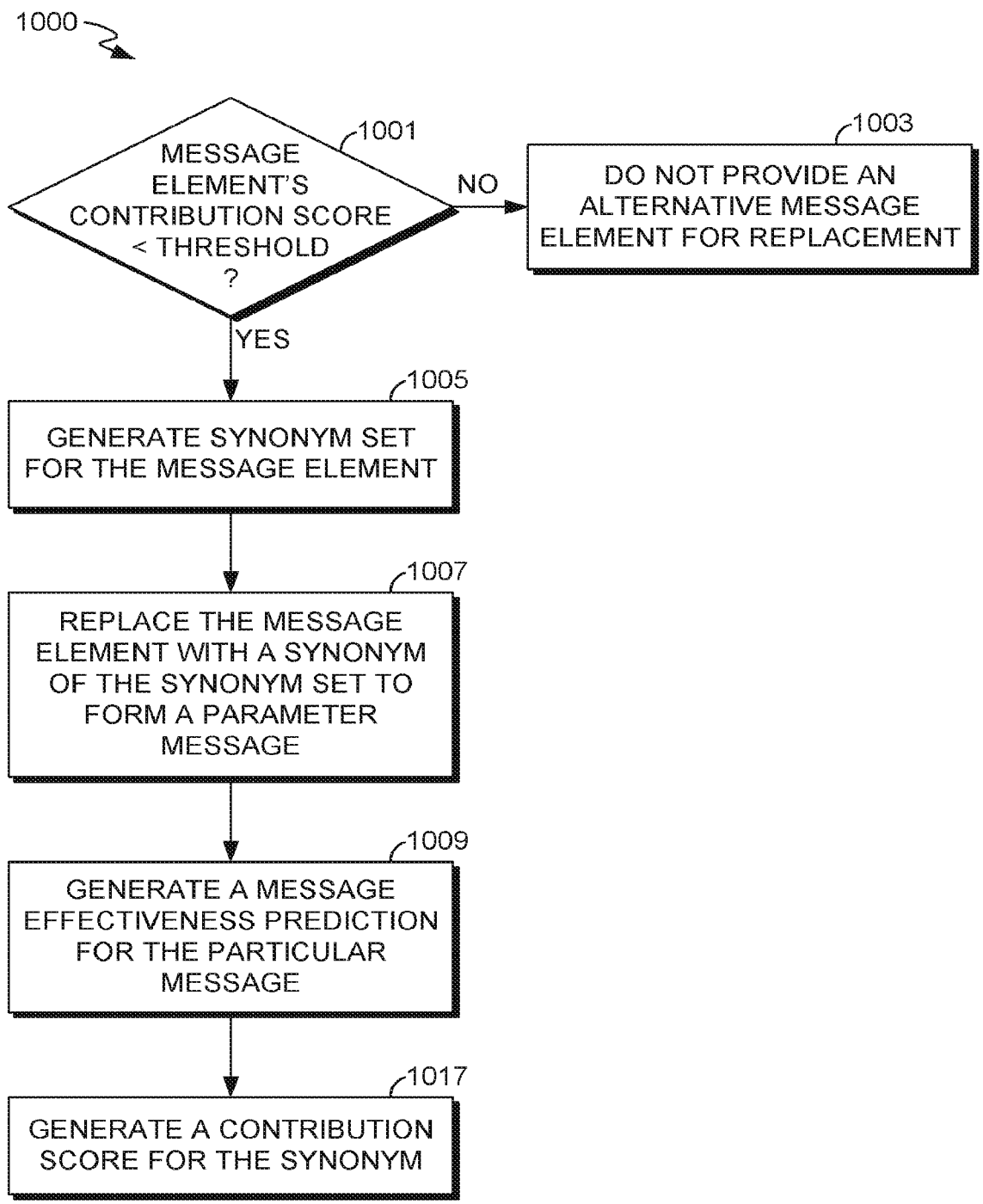
FIG. 10 is a flow diagram of an example process for replacing a message element with a synonym of the message element, according to some embodiments.

FIG. 10 is a flow diagram of an example process 1000 for replacing a message element with a synonym of the message element, according to some embodiments. In some embodiments, the process 1000 occurs as a part of or entirely block 811 of the process 800 of FIG. 8. In some embodiments, the process 1000 occurs for each message element replacement candidate. In yet other embodiments, the process 1000 is performed by the alternative word contribution scoring component 214 or 414.

Per block 1001 it is determined whether a message element's contribution score is less than a threshold. In some embodiments, block 1001 occurs in response to block 910 of FIG. 9 10. For example, using the illustration above, it can be determined whether the contribution score of 0.25 for the word element "memory foam" is below a threshold score (e.g., 0/0% or 0.95/95%). In some embodiments, if a contribution score is lower than zero (e.g., −4.5), this indicates that the predicted conversion rate of the message with the excluded message element is higher than the predicted conversion rate of the original message which contains the message element. Responsively, an inference can be made that the message element has a negative impact on the original message's conversion rate, which triggers block 10005 in various embodiments. In some embodiments, for each message element in the input message (e.g., the message received at block 902) that has a contribution score below the threshold score, blocks 10005 through 1011 are performed. Likewise, if a message element's contribution score is not less than the threshold at block 1001, then the system does not provide an alternative message element for replacement per block 10003.

Per block 1005, a synonym set for the message element (that is below the threshold) is generated. In some embodiments, this includes a lookup function in a data structure, such as a hash table or a dictionary of synonyms. For example, the message can be looked up in a data structure and mapped to its corresponding set of synonyms (e.g., based on being part of the same data record). Using the illustrative example above, if the message element of "memory foam" is below the threshold at block 1001, this message element can be located in a data structure and mapped to a list of synonyms, such as foam and "memory recall".

Per block 1007 the message element is replaced with a synonym of the synonym set to form a particular new message. For example, using the illustrative example above, the message element of "memory foam" is replaced with "memory recall" to form the altered message of "Brand X memory recall winter gloves 20% off". In various embodiments, blocks 1007 through 1011 is performed for synonyms within the synonym set. For example, using the illustration above this process can be repeated for the synonym "foam" (i.e., "Brand X foam winter gloves 20% off").

Per block 1009 a message effectiveness prediction is generated for the particular new or altered message. For example, using the illustration above, a conversion rate for the phrase "Brand X memory recall winter gloves 20% off" may be calculated (e.g., 0.18). Per block 1017 a contribution score can be generated for the synonym. For example, using the illustration above, "Brand X memory foam winter gloves 20% off" has a 0.38 predicted conversion rate. Accordingly, 0.18 is subtracted from 0.38 to arrive at a synonym contribution score of 0.20 or 20%. In various embodiments, each contribution score of each synonym in the set is compared to each other and only the highest or higher tier of contribution scores/synonyms are selected to provide as candidates to replace message elements. In some embodiments, each contribution score of the synonyms are alternatively or additionally compared to the corresponding original word element's contribution score. In this way, in some embodiments, each contribution score and/or corresponding message element (whether a synonym or an original message element) can be caused to be displayed in a manner than indicates ranking or order of score. For example, using the illustration above, the original message element of "memory foam" may have the highest contribution score and be located at the top. The next message element "foam" synonym may have the second highest score and located just underneath "memory foam." The message element "memory recall" synonym may have the lowest score. Consequently, it may be displayed last or underneath "foam".

Exemplary Operating Environments

Figure 11:
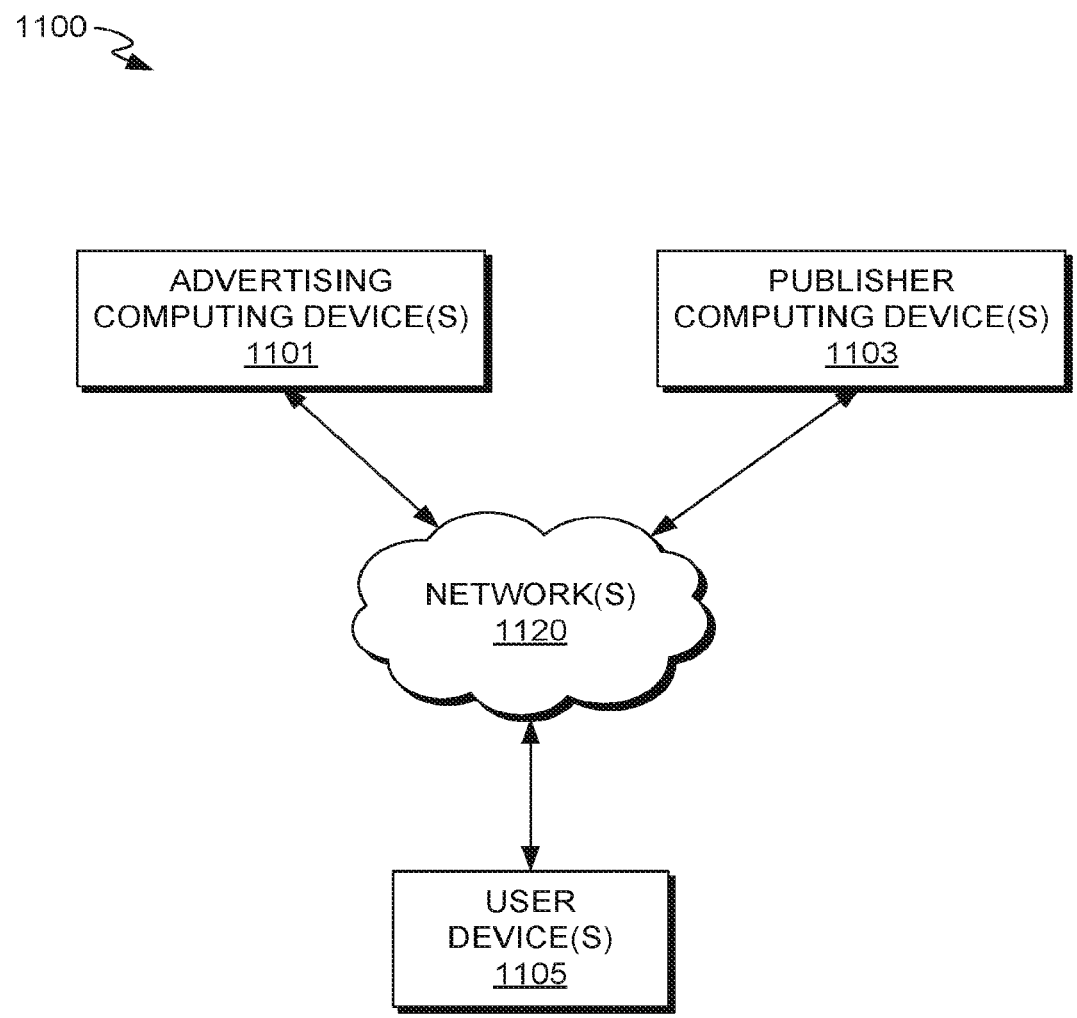
FIG. 11 is a computer environment in which aspects of the present disclosure are employed, according to some embodiments.

FIG. 11 is a computer environment 100 in which aspects of the present disclosure are employed in, according to some embodiments. In some embodiments, the environment 1100 is used after messages are no longer candidates and are finalized based on predicted conversion rates, contribution scores, etc. have already been made. For example, the environment 1100 may be utilized in response to the functionality occurring as described with respect to FIG. 1, FIG. 4, FIG. 7, FIG. 8, FIG. 9, and/or FIG. 10. In some embodiments, the environment 1100 represents a different network compared to the environment 100 of FIG. 1. In some embodiments, these environments are part of the same network where all of the components of FIG. 1 and FIG. 11 are communicatively coupled.

The Advertising computing device(s) 1101 represent network advertising entities that negotiate with the publisher computing device(s) 1103 to advertise one or more messages on the publisher computing device 1103 platform. These messages are then caused to be displayed on the platform 1103 to the one or more user devices 1105. In some embodiments, the advertising computing device(s) 110 and the publisher computing device(s) 1103 are the same component such that advertisements are both generated and caused to be displayed within web or application pages of the same entity.

In an illustrative example of how these components interact, referring back to FIG. 7, in response to the user inputting a first message "Brand A Iridium sunglasses 10% off" in the field 701, the message effectiveness predictions being made (e.g., via the element 707). The user may decide that the first message with certain replacement or alternative words (i.e., a second message) has a high enough predicted conversion rate (e.g., "Brand A reflective coating sunglasses 30% off"). Responsively, a user device 1105 may be browsing or otherwise interacting with a website or application hosted by the advertising computing device(s) 1101. For example, a user may be browsing certain Brand A listings offered for sale in an electronic marketplace, such as reflective coating sunglasses. The user may complete a session or log off of the website or application associated with the advertising computing device(s) 1101 and responsively connect to another website or application page corresponding to the publisher computing device 1103. In response, the advertising computing device(s) may retarget the user by making a bid or otherwise negotiate parameters (e.g., pricing, content of the message, etc.). For example, the advertising computing device 1101 may transmit the second message identified above to the publisher computing device 1103 as a part of a bid in order for the second message to be displayed to the user device 1105 within the platform (e.g., web page or app page) of the publisher computing device 1103. In response to such bid or negotiation, the second message can be caused to be displayed to the user device 1105.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 12:
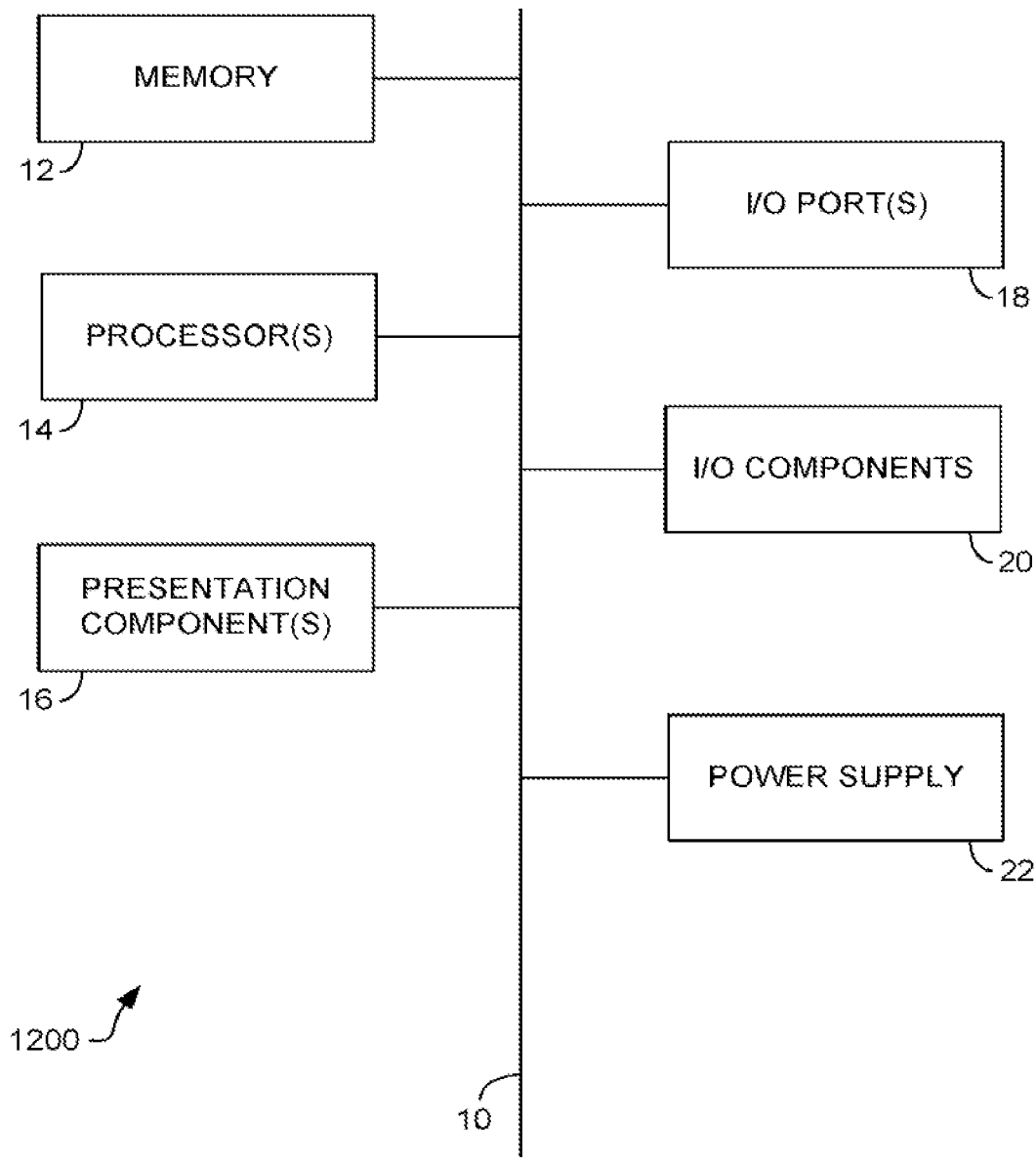
FIG. 12 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

Looking now to FIG. 12, computing device 1200 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

In various embodiments, the computing device 1200 represents the client device 120 and/or the server 110 of FIG. 1. In some embodiments, the computing device 1200 represents the advertising computing device(s) 1101, the publisher computing device(s) 1103, and/or the user device(s) 1105 of FIG. 11.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the processes 800, 900, and 1000 with respect to FIG. 8, FIG. 9, and FIG. 10.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:
   receiving a message for use in a computer network environment;
   parsing the message into message elements and processing the message elements through a natural language processing (NLP) component;
   based on the parsing, converting the message elements into a first set of vectors and mapping the first set of vectors in vector space based on processing the message elements through a model;
   based on the converting the message elements into the first set of vectors, generating a first score indicative of a predicted conversion rate for the message, the predicted conversion rate being indicative of predicting a proportion or quantity of all website or application users that will perform some predefined action associated with the message;
   generating a contribution score for each message element of the message elements, each contribution score being indicative of an amount that a respective message element contributes to the predicted conversion rate;
   determining that the contribution score of a first message element is below or outside of a threshold score, the first message element being below or outside the threshold score is indicative of the first message element not contributing enough to the predicted conversion rate to be a part of the message; and
   based at least in part on the determining that the contribution score of the first message element is below or outside of the threshold score: providing a second message element as a candidate to replace the first message element, or providing the first message element as a candidate for removal from the message.

2. The non-transitory computer readable medium of claim 1, wherein the model includes a word embedding vector model.

3. The non-transitory computer readable medium of claim 1, wherein the processing of the message elements through the NLP component comprises segmenting each of the message elements into morphemes and tagging the message elements with part of speech (POS) identifiers, and wherein semantic analysis is not performed on the message or the message elements.

4. The non-transitory computer readable medium of claim 1, wherein the message includes an advertisement, and wherein the message elements includes individual words of the advertisement.

5. The non-transitory computer readable medium of claim 1, wherein the model is used to replace the first message element of the message with the second message element based on a vector of the first message element being within a threshold distance in the vector space with another vector.

6. The non-transitory computer readable medium of claim 1, wherein the providing of the second message element to replace the first message element is further based on determining that the second message element is a synonym of the first message element and is associated with a conversion rate that is above a threshold score.

7. The non-transitory computer readable medium of claim 1, wherein the replacing the first message element with the second message element is based on determining that the second message element is closest to the first message element in the vector space of the model.

8. The non-transitory computer readable medium of claim 1, wherein the generating of the first score is further based on using a Random Forest Regression machine learning model.

9. The non-transitory computer readable medium of claim 1, the operations further comprising, in response to the generating of the first score, causing an altered message to be displayed to a publisher's website on a user device, wherein the altered message contains only a portion of the message.

10. A computer-implemented method comprising:
    receiving a message for use in a computer network environment;
    parsing the message into message elements and processing the message elements through a natural language processing (NLP) component;
    converting the message elements into a first set of vectors and mapping the first set of vectors in vector space based on processing the message elements through a model;
    generating a first score indicative of a predicted conversion rate for the message;
    generating a contribution score for each message element of the message elements, each contribution score being indicative of an amount that a respective message element contributes to the predicted conversion rate;
    determining that the contribution score of a first message element is below or outside of a threshold score, the first message element being below or outside the threshold score is indicative of the first message element not contributing enough to the predicted conversion rate to be a part of the message; and
    based at least in part on the determining that the contribution score of the first message element is below or outside of the threshold score: providing a second message element as a candidate to replace the first message element, or providing the first message element as a candidate for removal from the message.

11. The computer-implemented method of claim 10, wherein the model includes a word embedding vector model.

12. The computer-implemented method of claim 10, wherein the processing of the message elements through the NLP component comprises segmenting each of the message elements into morphemes and tagging the message elements with part of speech (POS) identifiers, and wherein semantic analysis is not performed on the message or the message elements.

13. The computer-implemented method of claim 10, wherein the message includes an advertisement, and wherein the message elements includes individual words of the advertisement.

14. The computer-implemented method of claim 10, wherein the model is used to replace the first message element of the message with the second message element based on a vector of the first message element being within a threshold distance in the vector space with another vector.

15. The computer-implemented method of claim 10, wherein the providing of the second message element to replace the first message element is further based on determining that the second message element is a synonym of the first message element and is associated with a conversion rate that is above a threshold score.

16. The computer-implemented method of claim 10, wherein the replacing the first message element with the second message element is based on determining that the second message element is closest to the first message element in the vector space of the model.

17. The computer-implemented method of claim 10, wherein the generating of the first score is further based on using a Random Forest Regression machine learning model.

18. The computer-implemented method of claim 10, further comprising, in response to the generating of the first score, causing an altered message to be displayed to a publisher's website on a user device, wherein the altered message contains only a portion of the message.

19. A computerized system comprising:
a parsing means for parsing a message into message elements and processing the message elements through a natural language processing (NLP) component, the message being indicative of a candidate advertisement for one or more services or one or more products;
a vectorization means for converting the message elements of the message into a first set of vectors and mapping the first set of vectors in vector space;
a conversion prediction means for generating a message effectiveness score based at least in part on the converting, the message effectiveness score being associated with a predicted conversion rate;
a word contribution scoring means for generating a contribution score for each message element of the message elements, each contribution score indicative of an amount that a respective message element contributes to the predicted message effectiveness score; and
an alternative word contribution scoring means for providing at least a second message element as a candidate to replace a first message element within the message based at least in part on the contribution score for the first message element.

20. The computerized system of claim 19, wherein each message element represents a respective word of the candidate advertisement.

* * * * *